United States Patent
Takeshita

(10) Patent No.: US 7,280,756 B2
(45) Date of Patent: Oct. 9, 2007

(54) OPTICAL SIGNAL TRANSMISSION SYSTEM, OPTICAL SIGNAL TRANSMITTER, OPTICAL SIGNAL RECEIVER, METHOD OF TRANSMITTING OPTICAL SIGNAL AND METHOD OF RECEIVING OPTICAL SIGNAL

(75) Inventor: Hitoshi Takeshita, Tokyo (JP)

(73) Assignee: NEC Corporation, Tokyo (JP)

( * ) Notice: Subject to any disclaimer, the term of this patent is extended or adjusted under 35 U.S.C. 154(b) by 856 days.

(21) Appl. No.: 10/613,070

(22) Filed: Jul. 7, 2003

(65) Prior Publication Data

US 2004/0005150 A1 Jan. 8, 2004

(30) Foreign Application Priority Data

Jul. 5, 2002 (JP) ............................. 2002-197853

(51) Int. Cl.
*H04B 10/08* (2006.01)
*H04J 14/00* (2006.01)

(52) U.S. Cl. ............................. 398/57; 398/48; 398/49; 398/31; 398/33; 398/30

(58) Field of Classification Search .................. 398/31, 398/32, 33, 76, 30, 115, 48–51, 57
See application file for complete search history.

(56) References Cited

U.S. PATENT DOCUMENTS

2002/0145776 A1 * 10/2002 Chow et al. ................. 359/124

FOREIGN PATENT DOCUMENTS

| JP | 53-130053 | 11/1978 |
|---|---|---|
| JP | 59-176937 | 10/1984 |
| JP | 4-258035 | 9/1992 |
| JP | 5-336046 | 12/1993 |
| JP | 8-111665 | 4/1996 |
| JP | 7-193558 | 10/1996 |
| JP | 9-215072 | 8/1997 |
| JP | 11-55699 | 2/1999 |
| JP | 11-346202 | 12/1999 |
| JP | 2000-183821 | 6/2000 |
| WO | WO 02/11320 A2 | 2/2002 |

* cited by examiner

*Primary Examiner*—Dalzid Singh
(74) *Attorney, Agent, or Firm*—McGinn IP Law Group, PLLC

(57) ABSTRACT

A main optical signal is wavelength-multiplexed with an optical identifier which is different in wavelength from this main optical signal, before a wavelength-demultiplexing is take place at a desired point so as to isolate the optical identifier from the main optical signal for the purpose of monitoring establishment of correct or incorrect transmission route between transmission and receiving sides based on the detected optical identifier with reference to the stored corresponding data to the relationship between the main optical signal and the optical identifier which belongs to the main optical signal, wherein the monitoring is made without any photoelectric conversion of the main optical signal and any deterioration in quality of the main optical signal.

79 Claims, 6 Drawing Sheets

OPTICAL SIGNAL TRANSMISSION SYSTEM, OPTICAL SIGNAL TRANSMITTER, OPTICAL SIGNAL RECEIVER, METHOD OF TRANSMITTING OPTICAL SIGNAL AND METHOD OF RECEIVING OPTICAL SIGNAL

BACKGROUND OF THE INVENTION

1. Field of the Invention

The present invention relates to an optical signal transmission system, an optical signal transmitter, and an optical signal receiver, as well as a method of transmitting optical signal and a method of receiving optical signal. The present invention relates more particularly to an optical signal transmission system suitable for a wavelength-multiplexed optical network taking place a wavelength-multiplexing without depending upon a signal transmission rate and a transmission signal format.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

Typical one of the existent general communication networks is a synchronous digital hierarchy network, wherein a main signal is transmitted accompanying with an overhead which is to be used for maintenance and operation of the communication network. For example, J0 bite in the overhead is used as a trail identifier in order to monitor a correspondence between the signal transmission side and the signal receiving side, for the purpose of verifying a correct correspondence or an incorrect correspondence between the signal transmission side and the signal receiving side.

A switch such as a cross-connect switch for switching a signal transmission path may be provided in the synchronous digital hierarchy network. It is undesirable that any failure or any malfunction of the switch may cause a deficiency in correspondence relationship between the signal transmission side and the signal receiving side, This deficiency raises such a trouble that the signal may no longer be transmitted to an intended or desired destination in the receiving side. In order to avoid this trouble, it is effective to monitor undesired or unintended establishment of any incorrect connection between the transmitter and the receiver, wherein the monitoring process is made by use of the above-described trail identifier. If any incorrect connection or any signal disconnection is established and is detected, then a protection or a restoration is made to restore or recover the incorrectness, in order to keep a reliability of the network.

Not only the above-described synchronous digital hierarchy network as a time-multiplexing network but also the wavelength-multiplexed optical network need to monitor appearance of any incorrect connection or route between the signal transmitter and the signal receiver. The wavelength-multiplexed optical network is, however, advantageous in view of allowing the wavelength-multiplexing process to be independent from the transmission signal rate and the transmission signal format. The wavelength-multiplexed optical network does not avail a method for monitoring the correspondence between the signal transmitter and the signal receiver, provided that this method is similar to the method of using the overhead in the synchronous digital hierarchy network which accomplishes the signal-multiplexing in accordance with the fixed or predetermined frame format.

The reason for the above unavailability or inapplicability of the method of using the overhead to the wavelength-multiplexed optical network would be that the wavelength-multiplexed optical network accepts any optional formats of the main optical signals, and it is impossible to extract the overhead-bit from the main optical signals.

Consequently, it is necessary for the wavelength-multiplexed optical network to monitor the correspondence between the signal transmitter and the signal receiver without, however, depending upon the format of the main optical signal.

Japanese laid-open patent publications Nos. 9-215072 and 11-55699 disclose conventional methods of monitoring the correspondence between the signal transmitter and the signal receiver in the wavelength-multiplexed optical network, wherein pilot tone signals assigned with frequencies specific to wavelengths of the main optical signals are superimposed as identifiers to the main optical signals so as to monitor a set state of an optical path and an optical signal level. The superimposition of the pilot tone signal over the main optical signal causes not only a deterioration in carrier-to-noise ratio of the pilot tone signal but also another deterioration in quality of the main optical signal. Simple consideration of only the presence or the absence of the pilot tone signal may provide undesired limitations to a maximum value of a transmittable distance of the main optical signal and another maximum value of a transmission rate of the main optical signal. Further, a laser diode is sub-carrier-modulated with the pilot tone signal for emitting a main optical signal superimposed with the pilot tone signal. This makes it necessary for replace the pilot tone signal as an identifier to take place a photoelectric conversion of the main optical signal. The photoelectric conversion of the main optical signal is essential for replacing the pilot tone signal as an identifier.

In the above circumstances, the development of novel optical signal transmission system, optical signal transmitter and method of transmitting optical signal, which are free from the above problems is desirable.

SUMMARY OF THE INVENTION

Accordingly, it is an object of the present invention to provide a novel optical signal transmission system free from the above problems.

It is a further object of the present invention to provide a novel optical signal transmission system which is capable of monitoring that a correct connection or route is established in a wavelength-multiplexed optical network or an optical switch between a signal transmission side and a signal receiving side, independently from both an optical signal transmission rate and a transmission optical signal format, and without any substantive deterioration in quality of a main optical signal, and without any photoelectric conversion of the main optical signal.

It is a still further object of the present invention to provide a novel optical signal transmitter free from the above problems.

It is yet a further object of the present invention to provide a novel optical signal transmitter which allows monitoring that a correct connection or route is established in a wavelength-multiplexed optical network or an optical switch between a signal transmission side and a signal receiving side, independently from both an optical signal transmission rate and a transmission optical signal format, and without any substantive deterioration in quality of a main optical signal, and without any photoelectric conversion of the main optical signal.

It is further more object of the present invention to provide a novel optical signal receiver free from the above problems.

It is moreover object of the present invention to provide a novel optical signal receiver which allows monitoring that a correct connection or route is established in a wavelength-multiplexed optical network or an optical switch between a signal transmission side and a signal receiving side, independently from both an optical signal transmission rate and a transmission optical signal format, and without any substantive deterioration in quality of a main optical signal, and without any photoelectric conversion of the main optical signal.

It is still more object of the present invention to provide a novel method of monitoring establishment of a correct transmission route between a signal transmission side and a signal receiving side free from the above problems.

It is yet more object of the present invention to provide a novel method of monitoring establishment of a correct transmission route between a signal transmission side and a signal receiving side, which allows monitoring that a correct connection or route is established in a wavelength-multiplexed optical network or an optical switch between a signal transmission side and a signal receiving side, independently from both an optical signal transmission rate and a transmission optical signal format, and without any substantive deterioration in quality of a main optical signal, and without any photoelectric conversion of the main optical signal.

It is an additional object of the present invention to provide a novel method of transmitting optical signal free from the above problems.

It is a still additional object of the present invention to provide a novel method of transmitting optical signal, which allows monitoring that a correct connection or route is established in a wavelength-multiplexed optical network or an optical switch between a signal transmission side and a signal receiving side, independently from both an optical signal transmission rate and a transmission optical signal format, and without any substantive deterioration in quality of a main optical signal, and without any photoelectric conversion of the main optical signal.

It is another object of the present invention to provide a novel method of receiving optical signal free from the above problems.

It is still another object of the present invention to provide a novel method of receiving optical signal, which allows monitoring that a correct connection or route is established in a wavelength-multiplexed optical network or an optical switch between a signal transmission side and a signal receiving side, independently from both an optical signal transmission rate and a transmission optical signal format, and without any substantive deterioration in quality of a main optical signal, and without any photoelectric conversion of the main optical signal.

In accordance with the above resent invention, a main optical signal is wavelength-multiplexed with an optical identifier which is different in wavelength from this main optical signal, before a wavelength-demultiplexing is take place at a desired point so as to isolate the optical identifier from the main optical signal for the purpose of monitoring establishment of correct or incorrect transmission route between transmission and receiving sides based on the detected optical identifier with reference to the stored corresponding data to the relationship between the main optical signal and the optical identifier which belongs to the main optical signal, wherein the monitoring is made without any photoelectric conversion of the main optical signal and any deterioration in quality of the main optical signal.

No need for the above monitoring to make any photoelectric conversion of the main optical signal means that this monitoring can be made independently from the rate and the format of the main optical signal.

The present system permits wavelength-multiplexing of the main optical signal with the optical identifier not only at the transmission side of transmitting the main optical signal but also any positions included in a transmission path from the transmission side to the receiving side. Replacement of the optical identifier to the main optical signal is also permitted during the transmission path from the transmission side to the receiving side. These result in a desired increase in flexibility of the monitoring.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PRESENT INVENTIONS

Figure 1:
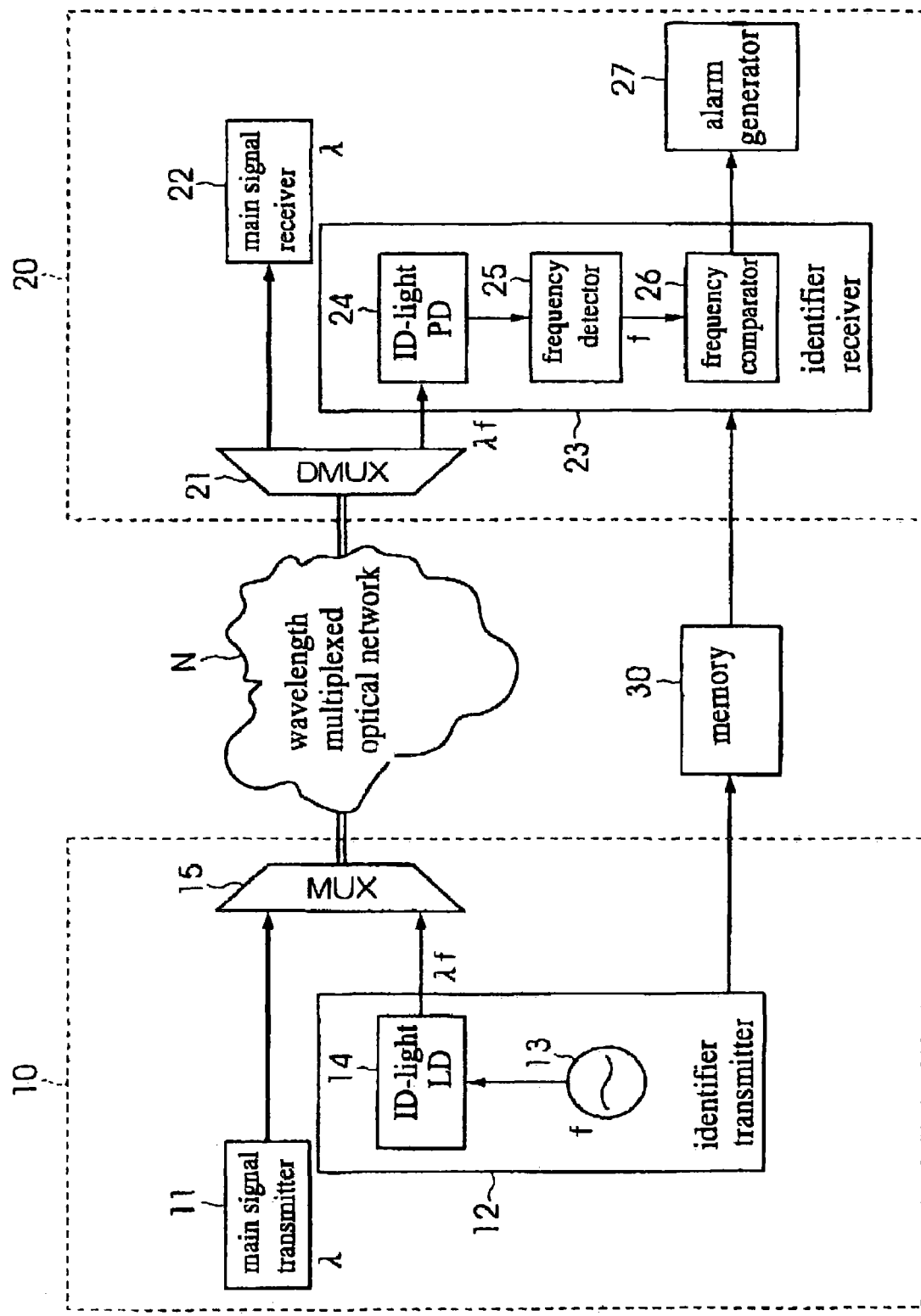
FIG. 1 is a block diagram illustrative of an optical signal transmission system including an optical signal transmitter and an optical signal receiver which are optically coupled to each other through a wavelength-multiplexed optical network in a first embodiment in accordance with the present invention.

A first aspect of the present invention is an optical signal transmission system including at least one optical signal transmitter and at least one optical signal receiver. The at least one optical signal transmitter generates at least one optical identifier belonging to and being different in wavelength from at least one main optical signal. The at least one optical signal transmitter performs a wavelength-multiplexing of the at least one main optical signal and the at least one optical identifier to transmit at least one wavelength-multiplexed optical signal to the at least one optical signal receiver. The at least one optical signal receiver performs a wavelength-demultiplexing of the at least one wavelength-multiplexed optical signal to generate the at least one main optical signal and the at least one optical identifier. The at least one optical signal receiver further verifies whether or not a correct transmission route is established, based on the at least optical identifier with reference to at least one set corresponding data, which include a first relationship in correspondence between the at least one main optical signal and the at least one optical identifier.

The at least one optical signal receiver performs the verification by comparing the first relationship included in the at least one set corresponding data to a second relationship between the at least one main optical signal received by the at least one optical signal receiver and the at least one optical identifier detected by the at least one optical signal receiver.

It is advantageous that the at least one optical signal receiver performs the verification without subjecting the at least one main optical signal to any photoelectric conversion, and independently from any transmission rate and any format of the at least one main optical signal.

It is possible that the at least one optical signal transmitter further generates the at least one set corresponding data, and supplies the at least one optical signal receiver with the at least one set corresponding data.

It is possible to further include a memory being coupled to the optical signal transmitter and the optical signal receiver, and the memory storing the at least one set corresponding data.

It is possible to further include a data storing station being coupled to the optical signal transmitter and the optical signal receiver, and the data storing station storing the at least one set corresponding data.

It is also possible that each of the at least one optical signal transmitter and the at least one optical signal receiver previously stores the at least one set corresponding data.

It is also possible that the at least one optical signal receiver further includes: a notifying unit for receiving a result of the verification from the at least one optical signal receiver, and for notifying whether the correct transmission route is verified between the main optical signal transmitted by the at least one optical signal transmitter and the main optical signal received by the at least one optical signal receiver.

It is possible to further include a wavelength-multiplexed optical network having a plurality of wavelength-multiplexed optical signal transmission routes, through which the at least one wavelength-multiplexed optical signal is transmitted from the at least one optical signal transmitter to the at least one optical signal receiver.

It is possible to further include an optical switch having a plurality of selectable wavelength-multiplexed optical signal transmission routes, through which the at least one wavelength-multiplexed optical signal is transmitted from the at least one optical signal transmitter to the at least one optical signal receiver.

It is also possible that the at least one set corresponding data includes a relationship in correspondence between at least one wavelength of the at least one main optical signal and at least one reference electric frequency component of at least one frequency corresponding to the at least one main optical signal. The at least one optical signal receiver detects at least one electric frequency component from the at least one optical identifier wavelength-demultiplexed. The at least one optical signal receiver verifies whether the correct transmission route is established based on the at least one electric frequency component with reference to the at least one reference electric frequency component included in the at least one set corresponding data.

It is further possible that each of the at least one optical signal transmitter further includes: at least one set of a main optical signal generator for generating the at least one main optical signal, and an optical identifier generator for generating the at least one optical identifier and the at least one set corresponding data; and a multiplexer for wavelength-multiplexing the at least one main optical signal and the at least one optical identifier to generate the wavelength-multiplexed optical signal. Further, each of the at least one optical signal receiver further includes: a demultiplexer for wavelength-demultiplexing the wavelength-multiplexed optical signal to generate the at least one main optical signal and the at least one optical identifier; at least one set of a main optical signal receiver for receiving the at least one main optical signal wavelength-demultiplexed; and an optical identifier receiver for receiving the at least one optical identifier and the at least one set corresponding data, and the optical identifier receiver further verifies whether the correct transmission route is established based on the at least optical identifier with reference to the at least one set corresponding data.

It is further possible that each of the at least one optical identifier generator further includes: a frequency modulator for generating a frequency-modulated signal at a frequency corresponding to each of the at least one main optical signal; and an optical identifier generator for generating the at least one optical identifier frequency-modulated by the frequency-modulated signal. Further, each of the at least one optical identifier receiver further includes: a photoelectric converter for performing a photoelectric conversion of each of the at least one optical identifier into an detected electrical signal; a frequency detector for detecting an electric frequency component from the detected electrical signal; and a frequency comparator for comparing the electric frequency component detected to the at least one reference electric frequency component included in the at least one set corresponding data.

It is also possible that each of the at least one optical signal transmitter further includes: plural sets of the main optical signal generators and the optical identifier generators. Each of the at least one optical signal receiver further includes: plural sets of the main optical signal receivers and the optical identifier receivers. The main optical signal generators respectively generate the main optical signals with wavelengths different from each other. The optical identifier generators respectively generate the optical identifiers which belong to the main optical signals generated from the main optical signal generators, respectively, and the optical identifier generators further respectively generate plural sets of the corresponding data which respectively belong to the main optical signals generated from the main optical signal generators and the optical identifiers generated from the optical identifier generators. The main optical signal receivers receive the main optical signals from respectively corresponding ones of the main optical signal generators. The optical identifier receivers respectively receive the optical identifiers from respectively corresponding ones of the optical identifier generators, and the optical identifier receivers respectively receive the plural sets of the corresponding data from respectively corresponding ones of the optical identifier generators. Each of the optical identifier receivers verifies whether the correct transmission route is established based on each corresponding one of the optical identifiers with reference to each corresponding set of the corresponding data.

It is also possible that each of the at least one set corresponding data includes a relationship in correspondence between a first wavelength of the main optical signal and a second wavelength of the optical identifier uniquely belonging to the main optical signal, so that the second wavelength uniquely corresponds to the first wavelength. The at least one optical signal receiver selectively detects the at least one optical identifier with the second wavelength. The at least one optical signal receiver verifies whether the correct transmission route is established based on the detected at least one optical identifier with reference to the at least one set corresponding data.

It is also possible that each of the at least one optical signal transmitter further includes: at least one set of a main optical signal generator for generating the main optical signal with the first wavelength, and an optical identifier generator for generating the optical identifier with the second wavelength and for generating the at least one set corresponding data; and a multiplexer for wavelength-multiplexing the at least one main optical signal and the at least one optical identifier to generate the wavelength-multiplexed optical signal. Each of the at least one optical signal receiver further includes: a demultiplexer for wavelength-demultiplexing the wavelength-multiplexed optical signal to generate the at least one main optical signal and the at least one optical identifier; at least one set of a main optical signal receiver for selectively receiving the at least one main optical signal with the first wavelength, and an optical identifier receiver for selectively receiving the at least one optical identifier with the second wavelength, and wherein the optical identifier receiver further verifies whether the correct transmission route is established based on the at least optical identifier with reference to the at least one set corresponding data.

It is also possible that each of the at least one optical identifier generator further includes: an optical identifier generator for generating the optical identifier having the second wavelength. Each of the at least one main optical signal receiver further includes: a first optical filter for selectively transmitting the main optical signal with the first wavelength; and a main optical signal receiver for receiving the main optical signal with the first wavelength transmitted through the first optical filter. Each of the at least one optical identifier receiver further includes: a second optical filter for selectively transmitting the optical identifier with the second wavelength; and an optical identifier detector for detecting the optical identifier with the second wavelength transmitted through the second optical filter; and for comparing the optical identifier having the second wavelength to the at least one set corresponding data.

It is also possible that each of the at least one optical signal transmitter further includes: plural sets of the main optical signal generators and the optical identifier generators. Each of the at least one optical signal receiver further includes: the main optical signal receivers and the optical identifier receivers. The main optical signal generators respectively generate the main optical signals with wavelengths different from each other. The optical identifier generators respectively generate the optical identifiers having wavelengths respectively correspond to the wavelengths of the main optical signals generated from the main optical signal generators, and the optical identifier generators further respectively generate plural sets of the corresponding data which respectively belong to the main optical signals generated from the main optical signal generators and the optical identifiers generated from the optical identifier generators. The main optical signal receivers receive the main optical signals from respectively corresponding ones of the main optical signal generators. The optical identifier receivers respectively receive the optical identifiers from respectively corresponding ones of the optical identifier generators, and the optical identifier receivers respectively receive the plural sets of the corresponding data from respectively corresponding ones of the optical identifier generators. Each of the optical identifier receivers verifies whether the correct transmission route is established based on each corresponding one of the optical identifiers with reference to each corresponding set of the corresponding data.

It is also possible that each of the at least one optical signal transmitter further includes: at least one set of a main optical signal generator for generating the main optical signal with the first wavelength, and an optical identifier generator for generating the optical identifier with the second wavelength and for generating the at least one set corresponding data; and a multiplexer for wavelength-multiplexing the at least one main optical signal and the at least one optical identifier to generate the wavelength-multiplexed optical signal. Each of the at least one optical signal receiver further includes: an arrayed waveguide grating for wavelength-demultiplexing the wavelength-multiplexed optical signal to generate the at least one main optical signal with the first wavelength and the at least one optical identifier with the second wavelength; at least one set of a main optical signal receiver for selectively receiving the at least one main optical signal with the first wavelength, and an optical identifier receiver for selectively receiving the at least one optical identifier with the second wavelength, and wherein the optical identifier receiver further verifies whether the correct transmission route is established based on the at least optical identifier with reference to the at least one set corresponding data.

It is also possible that each of the at least one optical identifier generator further includes: an optical identifier generator for generating the optical identifier having the second wavelength. Each of the at least one main optical signal receiver further includes: a main optical signal receiver for receiving the main optical signal with the first wavelength transmitted through the arrayed waveguide grating. Each of the at least one optical identifier receiver further includes: an optical identifier detector for detecting the optical identifier with the second wavelength transmitted through the arrayed waveguide grating; and for comparing the optical identifier having the second wavelength to the at least one set corresponding data.

A second aspect of the present invention is an optical signal transmitter including: a first transmitter function block for generates at least one optical identifier belonging to and being different in wavelength from at least one main optical signal; and a second transmitter function block for performing a wavelength-multiplexing of the at least one main optical signal and the at least one optical identifier to transmit at least one wavelength-multiplexed optical signal.

It is possible that the first transmitter function block further generates at least one set corresponding data, which include a first relationship in correspondence between the at least one main optical signal and the at least one optical identifier.

It is also possible that the second transmitter function block sends the at least one set corresponding data to a memory, so that the memory stores the at least one set corresponding data.

It is also possible that the second transmitter function block sends the at least one set corresponding data to a data storing station, so that the data storing station stores the at least one set corresponding data.

It is also possible that the first transmitter function block previously stores the at least one set corresponding data.

It is also possible that the second transmitter function block transmits the at least one wavelength-multiplexed optical signal through a wavelength-multiplexed optical network having a plurality of wavelength-multiplexed optical signal transmission routes.

It is also possible that the second transmitter function block transmits the at least one wavelength-multiplexed optical signal through an optical switch having a plurality of selectable wavelength-multiplexed optical signal transmission routes.

It is also possible that the at least one set corresponding data includes a relationship in correspondence between at least one wavelength of the at least one main optical signal and at least one reference electric frequency component of at least one frequency corresponding to the at least one main optical signal.

It is also possible that the first transmitter function block further includes: at least one set of a main optical signal generator for generating the at least one main optical signal, and an optical identifier generator for generating the at least one optical identifier and the at least one set corresponding data. The second transmitter function block further includes: a multiplexer for wavelength-multiplexing the at least one main optical signal and the at least one optical identifier to generate the wavelength-multiplexed optical signal.

It is also possible that the at least one optical identifier generator further includes: a frequency modulator for generating a frequency-modulated signal at a frequency corresponding to each of the at least one main optical signal; and an optical identifier generator for generating the at least one optical identifier frequency-modulated by the frequency-modulated signal.

It is also possible that the first transmitter function block further includes: plural sets of the main optical signal generators and the optical identifier generators. The main optical signal generators respectively generate the main optical signals with wavelengths different from each other. The optical identifier generators respectively generate the optical identifiers which belong to the main optical signals generated from the main optical signal generators, respectively, and the optical identifier generators further respectively generate plural sets of the corresponding data which respectively belong to the main optical signals generated from the main optical signal generators and the optical identifiers generated from the optical identifier generators.

It is also possible that each of the at least one set corresponding data includes a relationship in correspondence between a first wavelength of the main optical signal and a second wavelength of the optical identifier uniquely belonging to the main optical signal, so that the second wavelength uniquely corresponds to the first wavelength.

It is also possible that the first transmitter function block further includes: at least one set of a main optical signal generator for generating the main optical signal with the first wavelength, and an optical identifier generator for generating the optical identifier with the second wavelength and for generating the at least one set corresponding data. The second transmitter function block further includes: a multiplexer for wavelength-multiplexing the at least one main optical signal and the at least one optical identifier to generate the wavelength-multiplexed optical signal.

It is also possible that each of the at least one optical identifier generator further includes: an optical identifier generator for generating the optical identifier having the second wavelength.

It is also possible that the first transmitter function block further includes: plural sets of the main optical signal generators and the optical identifier generators. The main optical signal generators respectively generate the main optical signals with wavelengths different from each other. The optical identifier generators respectively generate the optical identifiers having wavelengths respectively correspond to the wavelengths of the main optical signals generated from the main optical signal generators, and the optical identifier generators further respectively generate plural sets of the corresponding data which respectively belong to the main optical signals generated from the main optical signal generators and the optical identifiers generated from the optical identifier generators.

It is also possible that the first transmitter function block further includes: at least one set of a main optical signal generator for generating the main optical signal with the first wavelength, and an optical identifier generator for generating the optical identifier with the second wavelength and for generating the at least one set corresponding data. The second transmitter function block further includes: a multiplexer for wavelength-multiplexing the at least one main optical signal and the at least one optical identifier to generate the wavelength-multiplexed optical signal.

It is also possible that each of the at least one optical identifier generator further includes: an optical identifier generator for generating the optical identifier having the second wavelength.

A third aspect of the present invention is an optical signal receiver including: a first receiver function block for performing a wavelength-demultiplexing of at least one wavelength-multiplexed optical signal to generate at least one main optical signal and at least one optical identifier; and a second receiver function block for verifying whether or not a correct transmission route is established, based on the at least optical identifier with reference to at least one set corresponding data, which include a first relationship in correspondence between the at least one main optical signal and the at least one optical identifier.

The second receiver function performs the verification by comparing the first relationship included in the at least one set corresponding data to a second relationship between the at least one main optical signal received by the at least one optical signal receiver and the at least one optical identifier detected by the at least one optical signal receiver.

The second receiver function block performs the verification without subjecting the at least one main optical signal to any photoelectric conversion, and independently from any transmission rate and any format of the at least one main optical signal.

It is also possible that the second receiver function block receives the at least one set corresponding data stored in a memory.

It is also possible that the second receiver function block receives the at least one set corresponding data stored in a data storing station.

It is also possible that the second receiver function block previously stores the at least one set corresponding data.

It is also possible to further include: a notifying unit for receiving a result of the verification from the at least one optical signal receiver, and for notifying whether the correct transmission route is verified between the main optical signal transmitted and the main optical signal received by the at least one optical signal receiver.

It is also possible that the first receiver function block receives the at least one wavelength-multiplexed optical signal transmitted from a wavelength-multiplexed optical network having a plurality of wavelength-multiplexed optical signal transmission routes.

It is also possible that the first receiver function block receives the at least one wavelength-multiplexed optical signal transmitted from an optical switch having a plurality of selectable wavelength-multiplexed optical signal transmission routes.

It is also possible that the at least one set corresponding data includes a relationship in correspondence between at least one wavelength of the at least one main optical signal and at least one reference electric frequency component of at least one frequency corresponding to the at least one main optical signal. The second receiver function block detects at least one electric frequency component from the at least one optical identifier wavelength-demultiplexed. The second receiver function block verifies whether the correct transmission route is established based on the at least one electric frequency component with reference to the at least one reference electric frequency component included in the at least one set corresponding data.

It is also possible that the first receiver function block further includes: a demultiplexer for wavelength-demultiplexing the wavelength-multiplexed optical signal to generate the at least one main optical signal and the at least one optical identifier; and at least one set of a main optical signal receiver for receiving the at least one main optical signal wavelength-demultiplexed. The second receiver function block further includes: an optical identifier receiver for receiving the at least one optical identifier and the at least one set corresponding data, and the optical identifier receiver further verifies whether the correct transmission route is established based on the at least optical identifier with reference to the at least one set corresponding data.

It is also possible that each of the at least one optical identifier receiver further includes: a photoelectric converter for performing a photoelectric conversion of each of the at least one optical identifier into an detected electrical signal; a frequency detector for detecting an electric frequency component from the detected electrical signal; and a frequency comparator for comparing the electric frequency component detected to the at least one reference electric frequency component included in the at least one set corresponding data.

It is also possible that the optical signal receiver further includes: plural sets of the main optical signal receivers and the optical identifier receivers. The main optical signal receivers receive the main optical signals from respectively corresponding ones of the main optical signal generators. The optical identifier receivers respectively receive the optical identifiers from respectively corresponding ones of the optical identifier generators, and the optical identifier receivers respectively receive the plural sets of the corresponding data from respectively corresponding ones of the optical identifier generators. Each of the optical identifier receivers verifies whether the correct transmission route is established based on each corresponding one of the optical identifiers with reference to each corresponding set of the corresponding data.

It is also possible that each of the at least one set corresponding data includes a relationship in correspondence between a first wavelength of the main optical signal and a second wavelength of the optical identifier uniquely belonging to the main optical signal, so that the second wavelength uniquely corresponds to the first wavelength. The second receiver function block selectively detects the at least one optical identifier with the second wavelength. The second receiver function block verifies whether the correct transmission route is established based on the detected at least one optical identifier with reference to the at least one set corresponding data.

It is also possible that the first receiver function block further includes: a demultiplexer for wavelength-demultiplexing the wavelength-multiplexed optical signal to generate the at least one main optical signal and the at least one optical identifier. The second receiver function block further includes: at least one set of a main optical signal receiver for selectively receiving the at least one main optical signal with the first wavelength, and an optical identifier receiver for selectively receiving the at least one optical identifier with the second wavelength, and wherein the optical identifier receiver further verifies whether the correct transmission route is established based on the at least optical identifier with reference to the at least one set corresponding data.

It is also possible that each of the at least one main optical signal receiver further includes: a first optical filter for selectively transmitting the main optical signal with the first wavelength; and a main optical signal receiver for receiving the main optical signal with the first wavelength transmitted through the first optical filter. Each of the at least one optical identifier receiver further includes: a second optical filter for selectively transmitting the optical identifier with the second wavelength; and an optical identifier detector for detecting the optical identifier with the second wavelength transmitted through the second optical filter; and for comparing the optical identifier having the second wavelength to the at least one set corresponding data.

It is also possible that the first receiver function block further includes the main optical signal receivers and the second receiver function block further includes the optical identifier receivers. The main optical signal receivers receive the main optical signals from respectively corresponding ones of the main optical signal generators. The optical identifier receivers respectively receive the optical identifiers from respectively corresponding ones of the optical identifier generators, and the optical identifier receivers respectively receive the plural sets of the corresponding data from respectively corresponding ones of the optical identifier generators. Each of the optical identifier receivers verifies whether the correct transmission route is established based on each corresponding one of the optical identifiers with reference to each corresponding set of the corresponding data.

It is also possible that the first receiver function block further includes: an arrayed waveguide grating for wavelength-demultiplexing the wavelength-multiplexed optical signal to generate the at least one main optical signal with the first wavelength and the at least one optical identifier with the second wavelength; and at least one main optical signal receiver for selectively receiving the at least one main optical signal with the first wavelength. The second receiver function block further includes: an optical identifier receiver for selectively receiving the at least one optical identifier with the second wavelength, and wherein the optical identifier receiver further verifies whether the correct transmission route is established based on the at least optical identifier with reference to the at least one set corresponding data.

It is also possible that each of the at least one main optical signal receiver further includes: a main optical signal receiver for receiving the main optical signal with the first wavelength transmitted through the arrayed waveguide grating. Each of the at least one optical identifier receiver further includes: an optical identifier detector for detecting the optical identifier with the second wavelength transmitted through the arrayed waveguide grating; and for comparing the optical identifier having the second wavelength to the at least one set corresponding data.

A fourth aspect of the present invention is a method of monitoring establishment of a correct transmission route between at least one optical signal transmitter and at least one optical signal receiver. At least one optical identifier is generated which belongs to and is different in wavelength from at least one main optical signal. A wavelength-multiplexing is performed of the at least one main optical signal and the at least one optical identifier to transmit at least one wavelength-multiplexed optical signal to the at least one optical signal receiver. A wavelength-demultiplexing is performed of the at least one wavelength-multiplexed optical signal to generate the at least one main optical signal and the at least one optical identifier. A verification is made of whether or not a correct transmission route is established, based on the at least optical identifier with reference to at least one set corresponding data, which include a first relationship in correspondence between the at least one main optical signal and the at least one optical identifier.

It is possible that the verification is made by comparing the first relationship included in the at least one set corresponding data to a second relationship between the at least one main optical signal received by the at least one optical signal receiver and the at least one optical identifier detected by the at least one optical signal receiver.

It is also possible that the verification is made without subjecting the at least one main optical signal to any photoelectric conversion, and independently from any transmission rate and any format of the at least one main optical signal.

It is also possible that the at least one set corresponding data is sent from the at least one optical signal transmitter to the at least one optical signal receiver.

It is also possible that the at least one set corresponding data is stored in a memory being coupled to the optical signal transmitter and the optical signal receiver.

It is also possible that the at least one set corresponding data is stored in a data storing station being coupled to the optical signal transmitter and the optical signal receiver.

It is also possible that the at least one set corresponding data is previously stored in each of the at least one optical signal transmitter and the at least one optical signal receiver.

It is also possible that a notification is made whether the correct transmission route is verified between the main optical signal transmitted by the at least one optical signal transmitter and the main optical signal received by the at least one optical signal receiver.

It is also possible that a transmission is made of the at least one wavelength-multiplexed optical signal from the at least one optical signal transmitter to the at least one optical signal receiver through a wavelength-multiplexed optical network having a plurality of wavelength-multiplexed optical signal transmission routes.

It is also possible that a transmission is made of the at least one wavelength-multiplexed optical signal from the at least one optical signal transmitter to the at least one optical signal receiver through an optical switch having a plurality of selectable wavelength-multiplexed optical signal transmission routes.

It is also possible that the at least one set corresponding data includes a relationship in correspondence between at least one wavelength of the at least one main optical signal and at least one reference electric frequency component of at least one frequency corresponding to the at least one main optical signal. At least one electric frequency component is detected from the at least one optical identifier wavelength-demultiplexed. A verification is made of whether the correct transmission route is established based on the at least one electric frequency component with reference to the at least one reference electric frequency component included in the at least one set corresponding data.

It is also possible that a frequency-modulated signal is generated at a frequency corresponding to each of the at least one main optical signal. The at least one optical identifier frequency-modulated is generated by the frequency-modulated signal. A photoelectric conversion is made of each of the at least one optical identifier into an detected electrical signal. An electric frequency component is detected from the detected electrical signal. The electric frequency component detected is compared to the at least one reference electric frequency component included in the at least one set corresponding data.

It is also possible that each of the at least one set corresponding data includes a relationship in correspondence between a first wavelength of the main optical signal and a second wavelength of the optical identifier uniquely belonging to the main optical signal, so that the second wavelength uniquely corresponds to the first wavelength. A selective detection is made for the at least one optical identifier with the second wavelength. A verification is made of whether the correct transmission route is established based on the detected at least one optical identifier with reference to the at least one set corresponding data.

It is also possible that the optical identifier having the second wavelength is generated. A selective transmission is made of the main optical signal with the first wavelength. A selective transmission is made of the optical identifier with the second wavelength. A detection is made of the optical identifier with the second wavelength transmitted through the second optical filter. A comparison is made of the optical identifier having the second wavelength to the at least one set corresponding data.

A fifth aspect of the present invention is a method of transmitting an optical signal. At least one optical identifier is generated which belongs to and is different in wavelength from at least one main optical signal. A wavelength-multiplexing is made of the at least one main optical signal and the at least one optical identifier to transmit at least one wavelength-multiplexed optical signal to the at least one optical signal receiver.

A sixth aspect of the present invention is a method of receiving an optical signal transmitted. A wavelength-demultiplexing is made of the at least one wavelength-multiplexed optical signal to generate the at least one main optical signal and the at least one optical identifier. A verification is made of whether or not a correct transmission route is established, based on the at least optical identifier with reference to at least one set corresponding data, which include a first relationship in correspondence between the at least one main optical signal and the at least one optical identifier.

It is also possible that the verification is made by comparing the first relationship included in the at least one set corresponding data to a second relationship between the at least one main optical signal received by the at least one optical signal receiver and the at least one optical identifier detected by the at least one optical signal receiver.

It is also possible that the verification is made without subjecting the at least one main optical signal to any photoelectric conversion, and independently from any transmission rate and any format of the at least one main optical signal.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

DETAILED DESCRIPTION OF THE PREFERRED EMBODIMENTS

First Embodiment

A first embodiment according to the present invention will be described in detail with reference to the drawings. FIG. 1 is a block diagram illustrative of an optical signal transmission system including an optical signal transmitter and an optical signal receiver which are optically coupled to each other through a wavelength-multiplexed optical network.

An optical signal transmission system includes an optical signal transmitter 10 and an optical signal receiver 20 which are optically coupled to each other through a wavelength-multiplexed optical network N. The optical signal transmission system further includes a memory 30 which is coupled to both the optical signal transmitter 10 and the optical signal receiver 20. This optical signal transmission system is configured to transmit only a main optical signal with a fixed single wavelength from the optical signal transmitter 10 through the wavelength-multiplexed optical network N to the optical signal receiver 20.

The optical signal transmitter 10 may further include a main optical signal transmitter 11, an optical identifier transmitter 12, and a wavelength-multiplexer 15. The main optical signal transmitter 11 transmits a main optical signal with a wavelength "λ" to the wavelength-multiplexer 15. The optical identifier transmitter 12 transmits an optical identifier which is to identify the main optical signal transmitted from the main optical signal transmitter 11. The optical identifier transmitter 12 may further include a frequency modulator 13 and an optical identifier emitting device 14 which may be realized by a laser diode which emits a laser beam as the optical identifier.

The optical identifier emitting device 14 emits an optical identifier which comprises a laser beam with a wavelength "λf" which is different from the wavelength "λ" of the main optical signal. The optical identifier with the wavelength "λf" is also transmitted to the wavelength-multiplexer 15. The frequency modulator 13 supplies the optical identifier emitting device 14 with a modulation signal at a frequency "f" which corresponds to the main optical signal with the wavelength "λ" which is outputted from the main optical signal transmitter 11.

The optical identifier transmitter 12 also supplies the memory 30 with corresponding data which show a relationship in correspondence between the wavelength "λ" of the main optical signal outputted from the main optical signal transmitter 11, and an electric frequency component of the frequency "f" corresponding to the main optical signal.

The wavelength-multiplexer 15 performs a wavelength-multiplexing of the main optical signal outputted from the main optical signal transmitter 11 and the optical identifier outputted from the optical identifier transmitter 12 and transmits a wavelength-multiplexed optical signal through the wavelength-multiplexed optical network N.

The wavelength-multiplexed optical network N allows transmissions of wavelength-multiplexed lights.

The memory 30 stores the above corresponding data from the optical identifier transmitter 12. The memory 30 may be realized by any available devices, typical examples of which may include, but not limited to, various semiconductor memory devices, various magnetic recording devices such as hard-disk devices, various optical magnetic recording devices, and various recording mediums.

The optical signal receiver 20 may include a wavelength-demultiplexer 21, a main optical signal receiver 22, an optical identifier receiver 23, and an alarm generator 27.

The wavelength-demultiplexer 21 receives the wavelength-multiplexed signal transmitted through the wavelength-multiplexed optical network N, and performs a wavelength-demultiplexing of the wavelength-multiplexed signal into the main optical signal and the optical identifier, so that the wavelength-demultiplexer 21 transmits the main optical signal to the main optical signal receiver 22 and also transmits the optical identifier to the optical identifier receiver 23. The main optical signal receiver 22 receives the main optical signal from the wavelength-demultiplexer 21.

The optical identifier receiver 23 receives the optical identifier from the wavelength-demultiplexer 21, so that the optical identifier receiver 23 detects an electric frequency component of the frequency "f" corresponding to the main optical signal with the wavelength "λ". The optical identifier receiver 23 may further include an optical identifier detector 24, a frequency detector 25 and a frequency comparator 26. The optical identifier detector 24 may be realized by a photo-detector PD which receives and detects the optical identifier.

The optical identifier detector 24 receives the optical identifier from the wavelength-demultiplexer 21, so that the optical identifier detector 24 performs a photoelectric conversion of the optical identifier into a detected electrical signal. The frequency detector 25 receives the detected electrical signal from the optical identifier detector 24 and detects an electric frequency component from the detected electrical signal.

The frequency comparator 26 receives the detected electric frequency component from the frequency detector 25 and also receives the corresponding data from the memory 30, so that the frequency comparator 26 performs a frequency-comparison of the detected electric frequency component and the reference electric frequency component included in the corresponding data, wherein the corresponding data show the relationship in correspondence between the wavelength "λ" of the main optical signal outputted from the main optical signal transmitter 11, and the reference electric frequency component of the frequency "f" corresponding to the main optical signal. The frequency comparator 26 generates a frequency-comparison result which represents a desired or intended establishment of correct connection or route, or an undesired or unintended establishment of incorrect connection or route in the wavelength-multiplexed optical network N. The frequency comparator 26 sends the frequency-comparison result to the alarm generator 27.

The alarm generator 27 generates an alarm based on the frequency-comparison result, if the frequency-comparison result is that the detected electric frequency component, which was included in the optical identifier, is different from the reference electric frequency component included in the corresponding data supplied from the memory 30. The difference between the detected electric frequency component and the reference electric frequency component represents that the undesired or unintended incorrect connection or route is established in the wavelength-multiplexed optical network N. Namely, the generated alarm alerts that the undesired or unintended incorrect connection or route is established in the wavelength-multiplexed optical network N.

The alarm generator 27 generates no alarm based on the frequency-comparison result, if the frequency-comparison result is that the detected electric frequency component, which was included in the optical identifier, is identical with the reference electric frequency component included in the corresponding data supplied from the memory 30. The identity between the detected electric frequency component and the reference electric frequency component represents that the undesired or unintended incorrect connection or route is established in the wavelength-multiplexed optical network N. Namely, no generation of alarm notifies that the desired or intended correct connection or route is established in the wavelength-multiplexed optical network N.

Subsequent descriptions will focus on operations of the optical signal transmission system, the optical signal transmitter and the optical signal receiver. Namely, methods of transmitting and receiving the optical signals will be described with reference continuously to FIG. 1.

As described above, the optical signal transmission system is configured to transmit only a main optical signal with a fixed single wavelength from the optical signal transmitter 10 through the wavelength-multiplexed optical network N to the optical signal receiver 20.

The main optical signal with a wavelength "$\lambda$" is transmitted from the main optical signal transmitter 11 to the wavelength-multiplexer 15. Further, the optical identifier is transmitted from the optical identifier transmitter 12 to the wavelength-multiplexer 15, wherein the optical identifier has the wavelength "$\lambda f$" which has been frequency-modulated at the frequency "f" corresponding to the main optical signal with the wavelength "$\lambda$" which is outputted from the main optical signal transmitter 11. The main optical signal and the optical identifier are wavelength-multiplexed by the wavelength-multiplexer 15, and the wavelength-multiplexed optical signal is then outputted from the wavelength-multiplexer 15 and transmitted through the wavelength-multiplexed optical network N.

On the other hand, the optical identifier transmitter 12 also supplies the memory 30 with corresponding data which show a relationship in correspondence between the wavelength "$\lambda$" of the main optical signal outputted from the main optical signal transmitter 11, and the electric frequency component of the frequency "f" corresponding to the main optical signal.

The wavelength-multiplexed signal transmitted through the wavelength-multiplexed optical network N is then received by the wavelength-demultiplexer 21, so that the wavelength-multiplexed signal is demultiplexed by the wavelength-demultiplexer 21 into the main optical signal and the optical identifier. The main optical signal is transmitted from the wavelength-demultiplexer 21 to the main optical signal receiver 22. The optical identifier is transmitted from the wavelength-demultiplexer 21 to the optical identifier detector 24 in the optical identifier receiver 23.

The optical identifier is then subjected to the photoelectric conversion into a detected electrical signal by the optical identifier detector 24. The detected electrical signal is transmitted from the optical identifier detector 24 to the frequency detector 25, so that the electric frequency component is detected from the detected electrical signal by the frequency detector 25.

As described above, the optical identifier received by the optical identifier detector 24 has the wavelength "$\lambda f$" which has been frequency-modulated at the frequency "f" corresponding to the main optical signal with the wavelength "$\lambda$". For this reason, the electric frequency component detected by the frequency detector 25 is identical with the frequency "f" corresponding to the main optical signal with the wavelength "$\lambda$" if the intended or correct connection or route is established in the wavelength-multiplexed optical network N.

The detected electric frequency component is transmitted from the frequency detector 25 to the frequency comparator 26. The corresponding data are also transmitted from the memory 30 to the frequency comparator 26. The frequency comparator 26 performs a frequency-comparison of the detected electric frequency component and the reference electric frequency component included in the corresponding data, wherein the corresponding data show the relationship in correspondence between the wavelength "$\lambda$" of the main optical signal outputted from the main optical signal transmitter 11, and the reference electric frequency component of the frequency "f" corresponding to the main optical signal. The frequency comparator 26 generates a frequency-comparison result which represents a desired or intended correct connection or an undesired or unintended incorrect connection in the wavelength-multiplexed optical network N. The frequency-comparison result is sent from the frequency comparator 26 to the alarm generator 27.

An alarm is generated by the alarm generator 27 based on the frequency-comparison result, if the frequency-comparison result is that the detected electric frequency component, which was included in the optical identifier, is different from the reference electric frequency component included in the corresponding data supplied from the memory 30. The difference between the detected electric frequency component and the reference electric frequency component represents that the undesired or unintended incorrect connection or route is established in the wavelength-multiplexed optical network N. Namely, the generated alarm alerts that the undesired or unintended incorrect connection or route is established in the wavelength-multiplexed optical network N.

No alarm is generated by the alarm generator 27 based on the frequency-comparison result, if the frequency-comparison result is that the detected electric frequency component, which was included in the optical identifier, is identical with the reference electric frequency component included in the corresponding data supplied from the memory 30. The identity between the detected electric frequency component and the reference electric frequency component represents that the undesired or unintended incorrect connection or route is established in the wavelength-multiplexed optical network N. Namely, no generation of alarm notifies that the desired or intended correct connection or route is established in the wavelength-multiplexed optical network N.

The wavelength-multiplexed optical network N has a large number of routes for transmissions of the wavelength-multiplexed optical signals including the main optical signal and the optical identifier. This wavelength-multiplexed optical network N allows wavelength-multiplexing independently from the signal transmission rate and the transmission signal format, for which reason, the above-described conventional method of using the overhead applied to the synchronous digital hierarchy network is not applicable in order to monitor any undesired or unintended connection or route established in the wavelength-multiplexed optical network N.

In accordance with this embodiment, the transmitter performs the following operations. The main optical signal is wavelength-multiplexed with the optical identifier to generate the wavelength-multiplexed optical signal which is then transited through the wavelength-multiplexed optical network N without any frequency modulation to the main optical signal. In parallel to this wavelength-multiplexed optical signal transmission without any frequency modulation to the main optical signal, the corresponding data are generated, which show a relationship in correspondence between the wavelength "$\lambda$" of the main optical signal, and the electric frequency component of the frequency "f" corresponding to the main optical signal with the wavelength "$\lambda$".

The wavelength-multiplexed optical signal is transmitted through the wavelength-multiplexed optical network N from the optical signal transmitter to the optical signal receiver.

The receiver performs the following operations. The wavelength-multiplexed optical signal is wavelength-demultiplexed into the main optical signal and the optical identifier. The electric frequency component is detected from the optical identifier. In parallel, the reference frequency information including the electric frequency component of the main optical signal is received from the transmitter, so that the electric frequency component derived from the optical identifier is compared to the electric frequency component derived from the reference frequency information. The identity between the electric frequency component derived from the optical identifier and the electric frequency component derived from the reference frequency information means that the intended or desired correct connection or route is established in the wavelength-multiplexed optical network N. The difference between the electric frequency component derived from the optical identifier and the electric frequency component derived from the reference frequency information means that the unintended or undesired incorrect connection or route is established in the wavelength-multiplexed optical network N. The monitoring to the correspondence between the optical signal transmitter and the optical signal receiver through the wavelength-multiplexed optical network N is accomplished with no frequency modulation to the main optical signal. No frequency modulation to the main optical signal causes no deterioration in quality of the main optical signal. Further, only the optical identifier wavelength-demultiplexed from the main optical signal is subjected to the photo-electric conversion to detect the electric frequency component from the optical identifier, while the wavelength-demultiplexed main optical signal is not subjected to any photo-electric conversion.

The optical identifier transmitter 12 may be coupled to the memory 30 through any available connection interface. The optical identifier receiver 23 may also be coupled to the memory 30 through any available connection interface. Typical examples of the available connection interface may include, but not limited to, any dedicated optical lines, and any dedicated electrical lines such as Ethernet (registered trademark).

As described above, the optical identifier transmitter 12 generates the corresponding data which show a relationship in correspondence between the wavelength "$\lambda$" of the main optical signal outputted from the main optical signal transmitter 11, and the electric frequency component of the frequency "f" corresponding to the main optical signal. The corresponding data are sent to the memory 30 and then stored in the memory 30, so that the optical identifier receiver 23 reads the corresponding data out of the memory 30.

As a modification to this embodiment, it is possible that the fixed corresponding data are previously stored in each of the optical identifier transmitter 12 and the optical identifier receiver 23 without using the memory 30.

As described above, the memory 30 may be realized by any available storing means, typical examples of which may include, but not limited to, various semiconductor memory devices, various magnetic recording devices such as hard-disk devices, various optical magnetic recording devices, various recording mediums, and any available data management stations or centers. The memory 30 may be placed at a single location or distributed.

Second Embodiment

Figure 2:
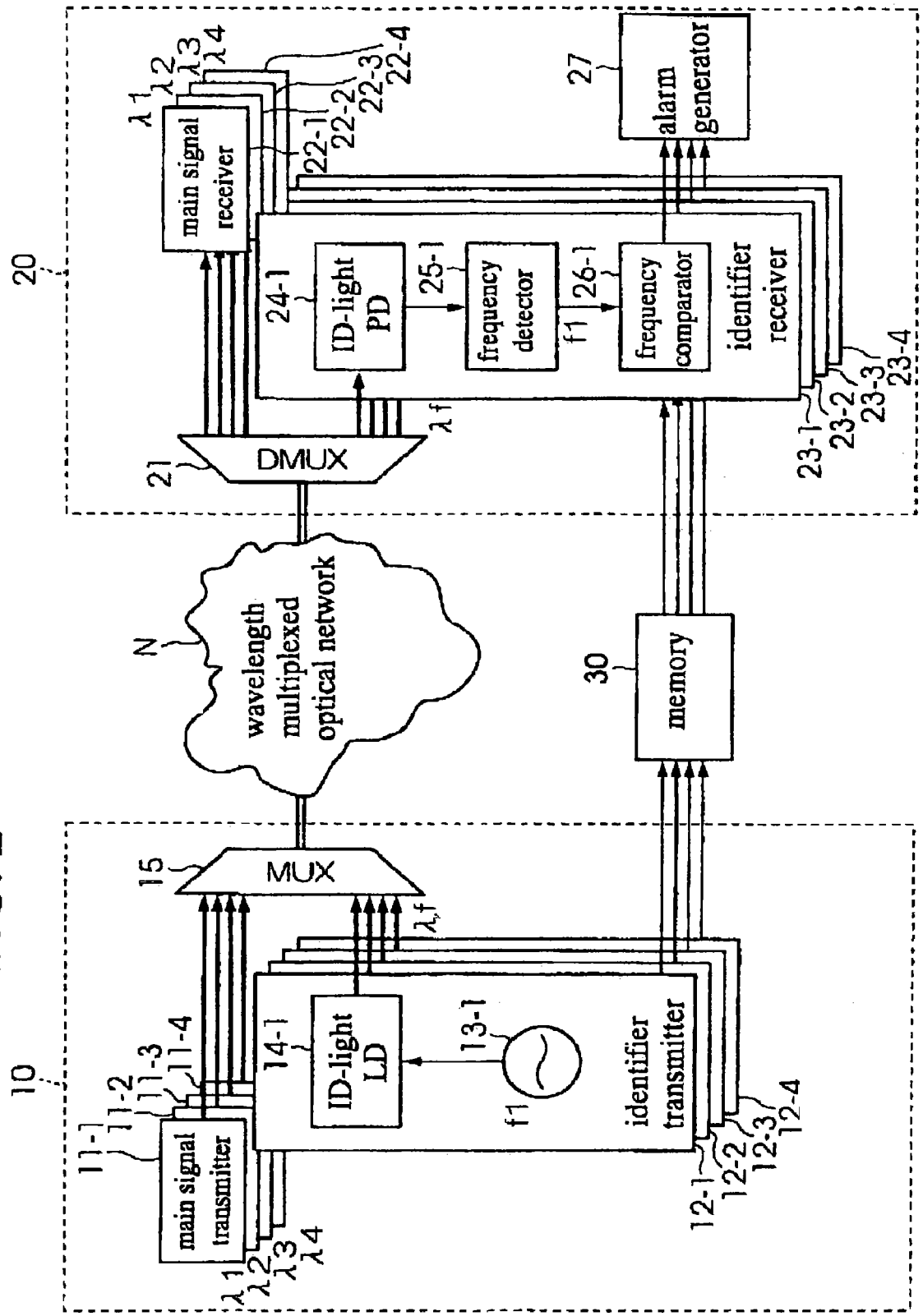
FIG. 2 is a block diagram illustrative of an optical signal transmission system including an optical signal transmitter and an optical signal receiver which are optically coupled to each other through a wavelength-multiplexed optical network in a second embodiment in accordance with the present invention.

A second embodiment according to the present invention will be described in detail with reference to the drawings. FIG. 2 is a block diagram illustrative of an optical signal transmission system including an optical signal transmitter and an optical signal receiver which are optically coupled to each other through a wavelength-multiplexed optical network.

An optical signal transmission system includes an optical signal transmitter 10 and an optical signal receiver 20 which are optically coupled to each other through a wavelength-multiplexed optical network N. The optical signal transmission system further includes a memory 30 which is coupled to both the optical signal transmitter 10 and the optical signal receiver 20. This optical signal transmission system is configured to transmit a plurality of main optical signals with wavelengths different from each other, from the optical signal transmitter 10 through the wavelength-multiplexed optical network N to the optical signal receiver 20.

The optical signal transmitter 10 may further include plural sets of main optical signal transmitters transmitting a plurality of main optical signals with wavelengths different from each other, optical identifier transmitters generating a plurality of optical identifiers belonging to the plurality of main optical signals respectively, and a single common wavelength-multiplexer for performing a wavelength-multiplexing of the plurality of main optical signals and the plurality of optical identifiers.

The optical signal receiver 20 may further include a common single wavelength-demultiplexer, plural sets of main optical signal receivers and optical identifier receiver, and a common single alarm generator.

The following descriptions will be made by assuming that the number of the above plural sets is four.

The optical signal transmitter 10 includes first to fourth main optical signal transmitters 11-1, 11-2, 11-3 and 11-4, first to fourth optical identifier transmitters 12-1, 12-2, 12-3, and 12-4, and a wavelength-multiplexer 15.

The first main optical signal transmitter 11-1 transmits a first main optical signal with a first wavelength "λ1" to the wavelength-multiplexer 15. The first optical identifier transmitter 12-1 transmits a first optical identifier which is to identify the first main optical signal transmitted from the first main optical signal transmitter 11-1. The first optical identifier transmitter 12-1 may further include a first frequency modulator 13-1 and a first optical identifier emitting device 14-1 which may be realized by a laser diode which emits a laser beam as the optical identifier.

The second main optical signal transmitter 11-2 transmits a second main optical signal with a second wavelength "λ2" to the wavelength-multiplexer 15. The second optical identifier transmitter 12-2 transmits a second optical identifier which is to identify the second main optical signal transmitted from the second main optical signal transmitter 11-2. The second optical identifier transmitter 12-2 may further include a second frequency modulator 13-2 and a second optical identifier emitting device 14-2 which may be realized by a laser diode which emits a laser beam as the optical identifier.

The third main optical signal transmitter 11-3 transmits a third main optical signal with a third wavelength "λ3" to the wavelength-multiplexer 15. The third optical identifier transmitter 12-3 transmits a third optical identifier which is to identify the third main optical signal transmitted from the third main optical signal transmitter 11-3. The third optical identifier transmitter 12-3 may further include a third frequency modulator 13-3 and a third optical identifier emitting device 14-3 which may be realized by a laser diode which emits a laser beam as the optical identifier.

The fourth main optical signal transmitter 11-4 transmits a fourth main optical signal with a fourth wavelength "λ4" to the wavelength-multiplexer 15. The fourth optical identifier transmitter 12-4 transmits a fourth optical identifier which is to identify the fourth main optical signal transmitted from the fourth main optical signal transmitter 11-4. The fourth optical identifier transmitter 12-4 may further include a fourth frequency modulator 13-4 and a fourth optical identifier emitting device 14-4 which may be realized by a laser diode which emits a laser beam as the optical identifier.

The first optical identifier emitting device 14-1 emits a first optical identifier which comprises a laser beam with a wavelength "λf" which is different from the first to fourth wavelengths "λ1", "λ2", "λ3, and "λ4" of the first to fourth main optical signals. The first frequency modulator 13-1 supplies the first optical identifier emitting device 14-1 with a first modulation signal at a first frequency "f1" which corresponds to the first main optical signal with the first wavelength "λ1" which is outputted from the first main optical signal transmitter 11-1. The first optical identifier with the wavelength "λf" is frequency-modulated at the first frequency "f1" which corresponds to the first main optical signal with the first wavelength "λ1".

The second optical identifier emitting device 14-2 emits a second optical identifier which comprises a laser beam with the wavelength "λf" which is different from the first to fourth wavelengths "λ1", "λ2", "λ3", and "λ4" of the first to fourth main optical signals. The second frequency modulator 13-2 supplies the second optical identifier emitting device 14-2 with a second modulation signal at a second frequency "f2" which corresponds to the second main optical signal with the second wavelength "λ2" which is outputted from the second main optical signal transmitter 11-2. The second optical identifier with the wavelength "λf" is frequency-modulated at the second frequency "f2" which corresponds to the second main optical signal with the second wavelength "λ2".

The third optical identifier emitting device 14-3 emits a third optical identifier which comprises a laser beam with the wavelength "λf" which is different from the first to fourth wavelengths "λ1", "λ2", "λ3, and "λ4" of the first to fourth main optical signals. The third frequency modulator 13-3 supplies the third optical identifier emitting device 14-3 with a third modulation signal at a third frequency "f3" which corresponds to the third main optical signal with the third wavelength "λ3" which is outputted from the third main optical signal transmitter 11-3. The third optical identifier with the wavelength "λf" is frequency-modulated at the third frequency "f3" which corresponds to the third main optical signal with the third wavelength "λ3".

The fourth optical identifier emitting device 14-4 emits a fourth optical identifier which comprises a laser beam with the wavelength "λf" which is different from the first to fourth wavelengths "λ1", "λ2", "λ3", and "λ4" of the first to fourth main optical signals. The fourth frequency modulator 13-4 supplies the fourth optical identifier emitting device 14-4 with a fourth modulation signal at a fourth frequency "f4" which corresponds to the fourth main optical signal with the fourth wavelength "λ4" which is outputted from the fourth main optical signal transmitter 11-4. The fourth optical identifier with the wavelength "λf" is frequency-modulated at the fourth frequency "f4" which corresponds to the fourth main optical signal with the fourth wavelength "λ4".

The first optical identifier transmitter 12-1 also supplies the memory 30 with first corresponding data which show a first relationship in correspondence between the first wavelength "λ1" of the first main optical signal outputted from the first main optical signal transmitter 11-1, and a first electric frequency component of the first frequency "f1" corresponding to the first main optical signal.

The second optical identifier transmitter 12-2 also supplies the memory 30 with second corresponding data which show a second relationship in correspondence between the second wavelength "λ2" of the second main optical signal outputted from the second main optical signal transmitter 11-2, and a second electric frequency component of the second frequency "f2" corresponding to the second main optical signal.

The third optical identifier transmitter 12-3 also supplies the memory 30 with third corresponding data which show a third relationship in correspondence between the third wavelength "λ3" of the third main optical signal outputted from the third main optical signal transmitter 11-3, and a third electric frequency component of the third frequency "f3" corresponding to the third main optical signal.

The fourth optical identifier transmitter 12-4 also supplies the memory 30 with fourth corresponding data which show a fourth relationship in correspondence between the fourth wavelength "λ4" of the fourth main optical signal outputted from the fourth main optical signal transmitter 11-4, and a fourth electric frequency component of the fourth frequency "f4" corresponding to the fourth main optical signal.

The wavelength-multiplexer 15 performs a wavelength-multiplexing of the first to fourth main optical signals outputted from the first to fourth main optical signal transmitters 11-1, 11-2, 11-3, and 11-4 and the first to fourth optical identifiers outputted from the first to fourth optical identifier transmitters 12-1, 12-2, 12-3, and 12-4 and transmits a wavelength-multiplexed optical signal through the wavelength-multiplexed optical network N.

The wavelength-multiplexed optical network N allows transmissions of wavelength-multiplexed lights.

The memory 30 stores the above first to fourth corresponding data from the first to fourth optical identifier transmitters 12-1, 12-2, 12-3 and 12-4. The memory 30 may be realized by any available devices, typical examples of which may include, but not limited to, various semiconductor memory devices, various magnetic recording devices such as hard-disk devices, various optical magnetic recording devices, and various recording mediums.

The optical signal receiver 20 may include a common single wavelength-demultiplexer 21, first to fourth main optical signal receivers 22-1, 22-2, 22-3, and 22-4, first to fourth optical identifier receivers 23-1, 23-2, 23-3 and 23-4, and a common single alarm generator 27.

The wavelength-demultiplexer 21 receives the wavelength-multiplexed signal transmitted through the wavelength-multiplexed optical network N, and performs a wavelength-demultiplexing of the wavelength-multiplexed signal into the first to fourth main optical signals and the common optical identifier, so that the wavelength-demultiplexer 21 transmits the first to fourth main optical signals to the first to fourth main optical signal receivers 22-1, 22-2, 22-3 and 22-4 and also transmits the common optical identifier to each of the first to fourth optical identifier receivers 23-1, 23-2, 23-3 and 23-4. The first to fourth main optical signal receivers 22-1, 22-2, 22-3, and 22-4 receive the first to fourth main optical signals from the wavelength-demultiplexer 21. The first to fourth optical identifier receivers 23-1, 23-2, 23-3 and 23-4 receive the common optical identifier.

The first optical identifier receiver 23-1 receives the common optical identifier from the wavelength-demultiplexer 21, so that the first optical identifier receiver 23-2 detects a first electric frequency component of the first frequency "f1" corresponding to the first main optical signal with the first wavelength "λ1". The first optical identifier receiver 23-1 may further include a first optical identifier detector 24-1, a first frequency detector 25-1 and a first frequency comparator 26-1. The first optical identifier detector 24-1 may be realized by a photo-detector PD which receives and detects the optical identifier.

The first optical identifier detector 24-1 receives the common optical identifier from the wavelength-demultiplexer 21, so that the first optical identifier detector 24-1 performs a photoelectric conversion of the first optical identifier into a first detected electrical signal. The first frequency detector 25-1 receives the first detected electrical signal from the first optical identifier detector 24-1 and detects a first electric frequency component from the first detected electrical signal.

The first frequency comparator 26-1 receives the first detected electric frequency component from the first frequency detector 25-1 and also receives the first corresponding data from the memory 30, so that the first frequency comparator 26-1 performs a frequency-comparison of the first detected electric frequency component and the first reference electric frequency component included in the first corresponding data, wherein the first corresponding data show the first relationship in correspondence between the first wavelength "λ1" of the first main optical signal outputted from the first main optical signal transmitter 11-1, and the first reference electric frequency component of the first frequency "f1" corresponding to the first main optical signal. The first frequency comparator 26-1 generates a frequency-comparison result which represents a desired or intended establishment of correct connection or route, or an undesired or unintended establishment of incorrect connection or route in the wavelength-multiplexed optical network N. The first frequency comparator 26-1 sends the first frequency-comparison result to the alarm generator 27.

The second optical identifier receiver 23-2 receives the common optical identifier from the wavelength-demultiplexer 21, so that the second optical identifier receiver 23-2 detects a second electric frequency component of the second frequency "f2" corresponding to the second main optical signal with the second wavelength "λ2". The second optical identifier receiver 23-2 may further include a second optical identifier detector 24-2, a second frequency detector 25-2 and a second frequency comparator 26-2. The second optical identifier detector 24-2 may be realized by a photo-detector PD which receives and detects the optical identifier.

The second optical identifier detector 24-2 receives the common optical identifier from the wavelength-demultiplexer 21, so that the second optical identifier detector 24-2 performs a photoelectric conversion of the second optical identifier into a second detected electrical signal. The second frequency detector 25-2 receives the second detected electrical signal from the second optical identifier detector 24-2 and detects a second electric frequency component from the second detected electrical signal.

The second frequency comparator 26-2 receives the second detected electric frequency component from the second frequency detector 25-2 and also receives the second corresponding data from the memory 30, so that the second frequency comparator 26-2 performs a frequency-comparison of the second detected electric frequency component and the second reference electric frequency component included in the second corresponding data, wherein the second corresponding data show the second relationship in correspondence between the second wavelength "λ2" of the second main optical signal outputted from the second main optical signal transmitter 11-2, and the second reference electric frequency component of the second frequency "f2" corresponding to the second main optical signal. The second frequency comparator 26-2 generates a frequency-comparison result which represents a desired or intended establishment of correct connection or route, or an undesired or unintended establishment of incorrect connection or route in the wavelength-multiplexed optical network N. The second frequency comparator 26-2 sends the second frequency-comparison result to the alarm generator 27.

The third optical identifier receiver 23-3 receives the common optical identifier from the wavelength-demultiplexer 21, so that the third optical identifier receiver 23-2 detects a third electric frequency component of the third frequency "f3" corresponding to the third main optical signal with the third wavelength "λ3". The third optical identifier receiver 23-3 may further include a third optical identifier detector 24-3, a third frequency detector 25-3 and a third frequency comparator 26-3. The third optical identifier detector 24-3 may be realized by a photo-detector PD which receives and detects the optical identifier.

The third optical identifier detector 24-3 receives the common optical identifier from the wavelength-demultiplexer 21, so that the third optical identifier detector 24-3 performs a photoelectric conversion of the third optical identifier into a third detected electrical signal. The third frequency detector 25-3 receives the third detected electrical signal from the third optical identifier detector 24-3 and detects a third electric frequency component from the third detected electrical signal.

The third frequency comparator 26-3 receives the third detected electric frequency component from the third frequency detector 25-3 and also receives the third corresponding data from the memory 30, so that the third frequency comparator 26-3 performs a frequency-comparison of the third detected electric frequency component and the third reference electric frequency component included in the third corresponding data, wherein the third corresponding data show the third relationship in correspondence between the third wavelength "λ3" of the third main optical signal outputted from the third main optical signal transmitter 11-3, and the third reference electric frequency component of the third frequency "f3" corresponding to the third main optical signal. The third frequency comparator 26-3 generates a frequency-comparison result which represents a desired or intended establishment of correct connection or route, or an undesired or unintended establishment of incorrect connection or route in the wavelength-multiplexed optical network N. The third frequency comparator 26-3 sends the third frequency-comparison result to the alarm generator 27.

The fourth optical identifier receiver 23-4 receives the common optical identifier from the wavelength-demultiplexer 21, so that the fourth optical identifier receiver 23-2 detects a fourth electric frequency component of the fourth frequency "f4" corresponding to the fourth main optical signal with the fourth wavelength "λ4". The fourth optical identifier receiver 23-4 may further include a fourth optical identifier detector 24-4, a fourth frequency detector 25-4 and a fourth frequency comparator 26-4. The fourth optical identifier detector 24-4 may be realized by a photo-detector PD which receives and detects the optical identifier.

The fourth optical identifier detector 24-4 receives the common optical identifier from the wavelength-demultiplexer 21, so that the fourth optical identifier detector 24-4 performs a photoelectric conversion of the fourth optical identifier into a fourth detected electrical signal. The fourth frequency detector 25-4 receives the fourth detected electrical signal from the fourth optical identifier detector 24-4 and detects a fourth electric frequency component from the fourth detected electrical signal.

The fourth frequency comparator 26-4 receives the fourth detected electric frequency component from the fourth frequency detector 25-4 and also receives the fourth corresponding data from the memory 30, so that the fourth frequency comparator 26-4 performs a frequency-comparison of the fourth detected electric frequency component and the fourth reference electric frequency component included in the fourth corresponding data, wherein the fourth corresponding data show the fourth relationship in correspondence between the fourth wavelength "λ4" of the fourth main optical signal outputted from the fourth main optical signal transmitter 11-4, and the fourth reference electric frequency component of the fourth frequency "f4" corresponding to the fourth main optical signal. The fourth frequency comparator 26-4 generates a frequency-comparison result which represents a desired or intended establishment of correct connection or route, or an undesired or unintended establishment of incorrect connection or route in the wavelength-multiplexed optical network N. The fourth frequency comparator 26-4 sends the fourth frequency-comparison result to the alarm generator 27.

The alarm generator 27 generates an alarm based on the first to fourth frequency-comparison results, if at least one of the first to fourth frequency-comparison results is that the detected electric frequency component, which was included in the optical identifier, is different from the reference electric frequency component included in corresponding one of the first to fourth corresponding data supplied from the memory 30. The difference between the detected electric frequency component and the reference electric frequency component represents that the undesired or unintended incorrect connection or route is established in the wavelength-multiplexed optical network N. Namely, the generated alarm alerts that the undesired or unintended incorrect connection or route is established in the wavelength-multiplexed optical network N.

The alarm generator 27 generates no alarm based on the frequency-comparison result, if each of the first to fourth frequency-comparison results is that the detected electric frequency component, which was included in the optical identifier, is identical with the reference electric frequency component included in each of the first to fourth corresponding data supplied from the memory 30. The identity between the detected electric frequency component and the reference electric frequency component represents that the undesired or unintended incorrect connection or route is established in the wavelength-multiplexed optical network N. Namely, no generation of alarm notifies that the desired or intended correct connection or route is established in the wavelength-multiplexed optical network N.

Subsequent descriptions will focus on operations of the optical signal transmission system, the optical signal transmitter and the optical signal receiver. Namely, methods of transmitting and receiving the optical signals will be described with reference continuously to FIG. 2.

As described above, the optical signal transmission system is configured to transmit first to fourth main optical signals with fixed different first to fourth wavelengths from the optical signal transmitter 10 through the wavelength-multiplexed optical network N to the optical signal receiver 20.

The first main optical signal with a first wavelength "λ1" is transmitted from the first main optical signal transmitter 11-1 to the wavelength-multiplexer 15. Further, the first optical identifier is transmitted from the first optical identifier transmitter 12-1 to the wavelength-multiplexer 15, wherein the first optical identifier has the wavelength "λf" which has been frequency-modulated at the first frequency "f1" corresponding to the first main optical signal with the first wavelength "λ1" which is outputted from the first main optical signal transmitter 11-1. The first main optical signal and the first optical identifier are wavelength-multiplexed by the wavelength-multiplexer 15, and the wavelength-multiplexed optical signal is then outputted from the wavelength-multiplexer 15 and transmitted through the wavelength-multiplexed optical network N.

On the other hand, the first optical identifier transmitter 12-1 also supplies the memory 30 with first corresponding data which show a first relationship in correspondence between the first wavelength "λ1" of the first main optical signal outputted from the first main optical signal transmitter 11-1, and the first electric frequency component of the first frequency "f1" corresponding to the first main optical signal.

The wavelength-multiplexed signal transmitted through the wavelength-multiplexed optical network N is then received by the wavelength-demultiplexer 21, so that the wavelength-multiplexed signal is demultiplexed by the wavelength-demultiplexer 21 into the first main optical signal and the common optical identifier. The first main optical signal is transmitted from the wavelength-demultiplexer 21 to the first main optical signal receiver 22. The common optical identifier is transmitted from the wavelength-demultiplexer 21 to the first optical identifier detector 24-1 in the first optical identifier receiver 23-1.

The common optical identifier is then subjected to the photoelectric conversion into a detected electrical signal by the first optical identifier detector 24-1. The first detected electrical signal is transmitted from the first optical identifier detector 24-1 to the first frequency detector 25-1, so that the electric frequency component is detected from the detected electrical signal by the first frequency detector 25-1.

As described above, the optical identifier received by the first optical identifier detector 24-1 has the wavelength "$\lambda f$". For this reason, the first electric frequency component detected by the first frequency detector 25-1 is identical with the first frequency "f1" corresponding to the first main optical signal with the first wavelength "$\lambda 1$" if the intended or correct connection or route is established in the wavelength-multiplexed optical network N.

The first detected electric frequency component is transmitted from the first frequency detector 25-1 to the first frequency comparator 26-1. The corresponding data are also transmitted from the memory 30 to the first frequency comparator 26-1. The first frequency comparator 26-1 performs a frequency-comparison of the first detected electric frequency component and the first reference electric frequency component included in the first corresponding data, wherein the first corresponding data show the first relationship in correspondence between the first wavelength "$\lambda 1$" of the first main optical signal outputted from the first main optical signal transmitter 11-1, and the first reference electric frequency component of the first frequency "f1" corresponding to the first main optical signal. The first frequency comparator 26-1 generates a first frequency-comparison result which represents a desired or intended correct connection or an undesired or unintended incorrect connection in the wavelength-multiplexed optical network N. The first frequency-comparison result is sent from the first frequency comparator 26-1 to the alarm generator 27.

The second main optical signal with a second wavelength "$\lambda 2$" is transmitted from the second main optical signal transmitter 11-2 to the wavelength-multiplexer 15. Further, the second optical identifier is transmitted from the second optical identifier transmitter 12-2 to the wavelength-multiplexer 15, wherein the second optical identifier has the wavelength "$\lambda f$" which has been frequency-modulated at the second frequency "f2" corresponding to the second main optical signal with the second wavelength "$\lambda 2$" which is outputted from the second main optical signal transmitter 11-2. The second main optical signal and the second optical identifier are wavelength-multiplexed by the wavelength-multiplexer 15, and the wavelength-multiplexed optical signal is then outputted from the wavelength-multiplexer 15 and transmitted through the wavelength-multiplexed optical network N.

On the other hand, the second optical identifier transmitter 12-2 also supplies the memory 30 with second corresponding data which show a second relationship in correspondence between the second wavelength "$\lambda 2$" of the second main optical signal outputted from the second main optical signal transmitter 11-2, and the second electric frequency component of the second frequency "f2" corresponding to the second main optical signal.

The wavelength-multiplexed signal transmitted through the wavelength-multiplexed optical network N is then received by the wavelength-demultiplexer 21, so that the wavelength-multiplexed signal is demultiplexed by the wavelength-demultiplexer 21 into the second main optical signal and the common optical identifier. The second main optical signal is transmitted from the wavelength-demultiplexer 21 to the second main optical signal receiver 22. The second optical identifier is transmitted from the wavelength-demultiplexer 21 to the second optical identifier detector 24-2 in the second optical identifier receiver 23-2.

The common optical identifier is then subjected to the photoelectric conversion into a detected electrical signal by the second optical identifier detector 24-2. The second detected electrical signal is transmitted from the second optical identifier detector 24-2 to the second frequency detector 25-2, so that the electric frequency component is detected from the detected electrical signal by the second frequency detector 25-2.

As described above, the optical identifier received by the second optical identifier detector 24-2 has the wavelength "$\lambda f$". For this reason, the second electric frequency component detected by the second frequency detector 25-2 is identical with the second frequency "f2" corresponding to the second main optical signal with the second wavelength "$\lambda 2$" if the intended or correct connection or route is established in the wavelength-multiplexed optical network N.

The second detected electric frequency component is transmitted from the second frequency detector 25-2 to the second frequency comparator 26-2. The corresponding data are also transmitted from the memory 30 to the second frequency comparator 26-2. The second frequency comparator 26-2 performs a frequency-comparison of the second detected electric frequency component and the second reference electric frequency component included in the second corresponding data, wherein the second corresponding data show the second relationship in correspondence between the second wavelength "$\lambda 2$" of the second main optical signal outputted from the second main optical signal transmitter 11-2, and the second reference electric frequency component of the second frequency "f2" corresponding to the second main optical signal. The second frequency comparator 26-2 generates a second frequency-comparison result which represents a desired or intended correct connection or an undesired or unintended incorrect connection in the wavelength-multiplexed optical network N. The second frequency-comparison result is sent from the second frequency comparator 26-2 to the alarm generator 27.

The third main optical signal with a third wavelength "$\lambda 3$" is transmitted from the third main optical signal transmitter 11-3 to the wavelength-multiplexer 15. Further, the third optical identifier is transmitted from the third optical identifier transmitter 12-3 to the wavelength-multiplexer 15, wherein the third optical identifier has the wavelength "$\lambda f$" which has been frequency-modulated at the third frequency "f3" corresponding to the third main optical signal with the third wavelength "$\lambda 3$" which is outputted from the third main optical signal transmitter 11-3. The third main optical signal and the third optical identifier are wavelength-multiplexed by the wavelength-multiplexer 15, and the wavelength-multiplexed optical signal is then outputted from the wavelength-multiplexer 15 and transmitted through the wavelength-multiplexed optical network N.

On the other hand, the third optical identifier transmitter 12-3 also supplies the memory 30 with third corresponding data which show a third relationship in correspondence between the third wavelength "$\lambda 3$" of the third main optical signal outputted from the third main optical signal transmitter 11-3, and the third electric frequency component of the third frequency "f3" corresponding to the third main optical signal.

The wavelength-multiplexed signal transmitted through the wavelength-multiplexed optical network N is then received by the wavelength-demultiplexer 21, so that the wavelength-multiplexed signal is demultiplexed by the wavelength-demultiplexer 21 into the third main optical signal and the common optical identifier. The third main optical signal is transmitted from the wavelength-demultiplexer 21 to the third main optical signal receiver 22. The common optical identifier is transmitted from the wavelength-demultiplexer 21 to the third optical identifier detector 24-3 in the third optical identifier receiver 23-3.

The common optical identifier is then subjected to the photoelectric conversion into a detected electrical signal by the third optical identifier detector 24-3. The third detected electrical signal is transmitted from the third optical identifier detector 24-1 to the third frequency detector 25-3, so that the electric frequency component is detected from the detected electrical signal by the third frequency detector 25-3.

As described above, the optical identifier received by the third optical identifier detector 24-3 has the wavelength "λf". For this reason, the third electric frequency component detected by the third frequency detector 25-3 is identical with the third frequency "f3" corresponding to the third main optical signal with the third wavelength "λ3" if the intended or correct connection or route is established in the wavelength-multiplexed optical network N.

The third detected electric frequency component is transmitted from the third frequency detector 25-3 to the third frequency comparator 26-3. The corresponding data are also transmitted from the memory 30 to the third frequency comparator 26-3. The third frequency comparator 26-3 performs a frequency-comparison of the third detected electric frequency component and the third reference electric frequency component included in the third corresponding data, wherein the third corresponding data show the third relationship in correspondence between the third wavelength "λ3" of the third main optical signal outputted from the third main optical signal transmitter 11-3, and the third reference electric frequency component of the third frequency "f3" corresponding to the third main optical signal. The third frequency comparator 26-3 generates a third frequency-comparison result which represents a desired or intended correct connection or an undesired or unintended incorrect connection in the wavelength-multiplexed optical network N. The third frequency-comparison result is sent from the third frequency comparator 26-3 to the alarm generator 27.

The fourth main optical signal with a fourth wavelength "λ4" is transmitted from the fourth main optical signal transmitter 11-4 to the wavelength-multiplexer 15. Further, the fourth optical identifier is transmitted from the fourth optical identifier transmitter 12-4 to the wavelength-multiplexer 15, wherein the fourth optical identifier has the wavelength "λf" which has been frequency-modulated at the fourth frequency "f4" corresponding to the fourth main optical signal with the fourth wavelength "λ4" which is outputted from the fourth main optical signal transmitter 11-4. The fourth main optical signal and the fourth optical identifier are wavelength-multiplexed by the wavelength-multiplexer 15, and the wavelength-multiplexed optical signal is then outputted from the wavelength-multiplexer 15 and transmitted through the wavelength-multiplexed optical network N.

On the other hand, the fourth optical identifier transmitter 12-4 also supplies the memory 30 with fourth corresponding data which show a fourth relationship in correspondence between the fourth wavelength "λ4" of the fourth main optical signal outputted from the fourth main optical signal transmitter 11-4, and the fourth electric frequency component of the fourth frequency "f4" corresponding to the fourth main optical signal.

The wavelength-multiplexed signal transmitted through the wavelength-multiplexed optical network N is then received by the wavelength-demultiplexer 21, so that the wavelength-multiplexed signal is demultiplexed by the wavelength-demultiplexer 21 into the fourth main optical signal and the common optical identifier. The fourth main optical signal is transmitted from the wavelength-demultiplexer 21 to the fourth main optical signal receiver 22. The common optical identifier is transmitted from the wavelength-demultiplexer 21 to the fourth optical identifier detector 24-4 in the fourth optical identifier receiver 23-4.

The common optical identifier is then subjected to the photoelectric conversion into a detected electrical signal by the fourth optical identifier detector 24-4. The fourth detected electrical signal is transmitted from the fourth optical identifier detector 24-4 to the fourth frequency detector 25-4, so that the electric frequency component is detected from the detected electrical signal by the fourth frequency detector 25-4.

As described above, the optical identifier received by the fourth optical identifier detector 24-4 has the wavelength "λf". For this reason, the fourth electric frequency component detected by the fourth frequency detector 25-4 is identical with the fourth frequency "f4" corresponding to the fourth main optical signal with the fourth wavelength "λ4" if the intended or correct connection or route is established in the wavelength-multiplexed optical network N.

The fourth detected electric frequency component is transmitted from the fourth frequency detector 25-4 to the fourth frequency comparator 26-4. The corresponding data are also transmitted from the memory 30 to the fourth frequency comparator 26-4. The fourth frequency comparator 26-4 performs a frequency-comparison of the fourth detected electric frequency component and the fourth reference electric frequency component included in the fourth corresponding data, wherein the fourth corresponding data show the fourth relationship in correspondence between the fourth wavelength "λ4" of the fourth main optical signal outputted from the fourth main optical signal transmitter 11-4, and the fourth reference electric frequency component of the fourth frequency "f4" corresponding to the fourth main optical signal. The fourth frequency comparator 26-4 generates a fourth frequency-comparison result which represents a desired or intended correct connection or an undesired or unintended incorrect connection in the wavelength-multiplexed optical network N. The fourth frequency-comparison result is sent from the fourth frequency comparator 26-4 to the alarm generator 27.

An alarm is generated by the alarm generator 27 based on the first to fourth frequency-comparison results, if any one of the first to fourth frequency-comparison results is that the detected electric frequency component, which was included in the optical identifier, is different from the reference electric frequency component included in the corresponding data supplied from the memory 30. The difference between the detected electric frequency component and the reference electric frequency component represents that the undesired or unintended incorrect connection or route is established in the wavelength-multiplexed optical network N. Namely, the generated alarm alerts that the undesired or unintended incorrect connection or route is established in the wavelength-multiplexed optical network N.

No alarm is generated by the alarm generator 27 based on the frequency-comparison result, if each of the first to fourth frequency-comparison results is that the detected electric frequency component, which was included in the optical identifier, is identical with the reference electric frequency component included in the corresponding data supplied from the memory 30. The identity between the detected electric frequency component and the reference electric frequency component represents that the undesired or unintended incorrect connection or route is established in the wavelength-multiplexed optical network N. Namely, no generation of alarm notifies that the desired or intended correct connection or route is established in the wavelength-multiplexed optical network N.

The wavelength-multiplexed optical network N has a large number of routes for transmissions of the wavelength-multiplexed optical signals including the main optical signal and the optical identifier. This wavelength-multiplexed optical network N allows wavelength-multiplexing independently from the signal transmission rate and the transmission signal format, for which reason, the above-described conventional method of using the overhead applied to the synchronous digital hierarchy network is not applicable in order to monitor any undesired or unintended connection or route established in the wavelength-multiplexed optical network N.

In accordance with this embodiment, the transmitter performs the following operations. The first to fourth main optical signals are wavelength-multiplexed with the first to fourth optical identifiers to generate the wavelength-multiplexed optical signal which is then transited through the wavelength-multiplexed optical network N without any frequency modulation to the main optical signal. In parallel to this wavelength-multiplexed optical signal transmission without any frequency modulation to the first to fourth main optical signals, the first to fourth corresponding data are generated, which show first to fourth relationships in correspondence between the first to fourth wavelengths "$\lambda 1$", "$\lambda 2$", "$\lambda 3$" and "$\lambda 4$" of the first to fourth main optical signals, and the first to fourth electric frequency components of the first to fourth frequency "f1", "f2", "f3", and "f4" corresponding to the first to fourth main optical signals with the first to fourth wavelength "$\lambda 1$", "$\lambda 2$", "$\lambda 3$" and "$\lambda 4$".

The wavelength-multiplexed optical signal is transmitted through the wavelength-multiplexed optical network N from the optical signal transmitter to the optical signal receiver.

The receiver performs the following operations. The wavelength-multiplexed optical signal is wavelength-demultiplexed into the first to fourth main optical signals and the first to fourth optical identifiers. The first to fourth electric frequency components are detected from the first to fourth optical identifiers. In parallel, the first to fourth reference frequency informations including the first to fourth electric frequency components of the first to fourth main optical signals are received from the transmitter, so that the first to fourth electric frequency components derived from the first to fourth optical identifiers are compared to the first to fourth electric frequency components derived from the first to fourth reference frequency informations. The identity between the electric frequency component derived from the optical identifier and the electric frequency component derived from the reference frequency information means that the intended or desired correct connection or route is established in the wavelength-multiplexed optical network N. The difference between the electric frequency component derived from the optical identifier and the electric frequency component derived from the reference frequency information means that the unintended or undesired incorrect connection or route is established in the wavelength-multiplexed optical network N. The monitoring to the correspondence between the optical signal transmitter and the optical signal receiver through the wavelength-multiplexed optical network N is accomplished with no frequency modulation to the main optical signal. No frequency modulation to the main optical signal causes no deterioration in quality of the main optical signal. Further, only the optical identifier wavelength-demultiplexed from the main optical signal is subjected to the photo-electric conversion to detect the electric frequency component from the optical identifier, while the wavelength-demultiplexed main optical signal is not subjected to any photo-electric conversion.

The first to fourth optical identifier transmitters 12-1, 12-2, 12-3 and 12-4 may be coupled to the memory 30 through any available connection interface. The first to fourth optical identifier receivers 23-1, 23-2, 23-3 and 23-4 may also be coupled to the memory 30 through any available connection interface. Typical examples of the available connection interface may include, but not limited to, any dedicated optical lines, and any dedicated electrical lines such as Ethernet (registered trademark).

As described above, the first to fourth optical identifier transmitters 12-1, 12-2, 12-3 and 12-4 generate the first to fourth corresponding data which show first to fourth relationships in correspondence between the first to fourth wavelengths "$\lambda 1$", "$\lambda 2$", "$\lambda 3$" and "$\lambda 4$" of the first to fourth main optical signals outputted from the first to fourth main optical signal transmitters 11-1, 11-2, 11-3 and 11-4, and the first to fourth electric frequency components of the first to fourth frequencies "f1", "f2", "f3" and "f4" corresponding to the first to fourth main optical signals. The corresponding data are sent to the memory 30 and then stored in the memory 30, so that the optical identifier receiver 23 reads the corresponding data out of the memory 30.

As a modification to this embodiment, it is possible that the fixed corresponding data are previously stored in each of the first to fourth optical identifier transmitters 12-1, 12-2, 12-3 and 12-4 and the first to fourth optical identifier receiver 23-1, 23-2, 23-3, 23-4 without using the memory 30.

As described above, the memory 30 may be realized by any available storing means, typical examples of which may include, but not limited to, various semiconductor memory devices, various magnetic recording devices such as hard-disk devices, various optical magnetic recording devices, various recording mediums, and any available data management stations or centers. The memory 30 may be placed at a single location or distributed.

The first to fourth optical identifiers are frequency modulated at different first to fourth frequencies "f1", "f2", "f3" and "f4" which are different from the first to fourth wavelengths "$\lambda 1$", "$\lambda 2$", "$\lambda 3$" and "$\lambda 4$", so that the first to fourth optical identifier receivers 23-1, 23-2, 23-3 and 23-4. As a modification, it is possible to provide a single optical identifier receiver 23 which monitors the first to fourth main optical signals.

Third Embodiment

Figure 3:
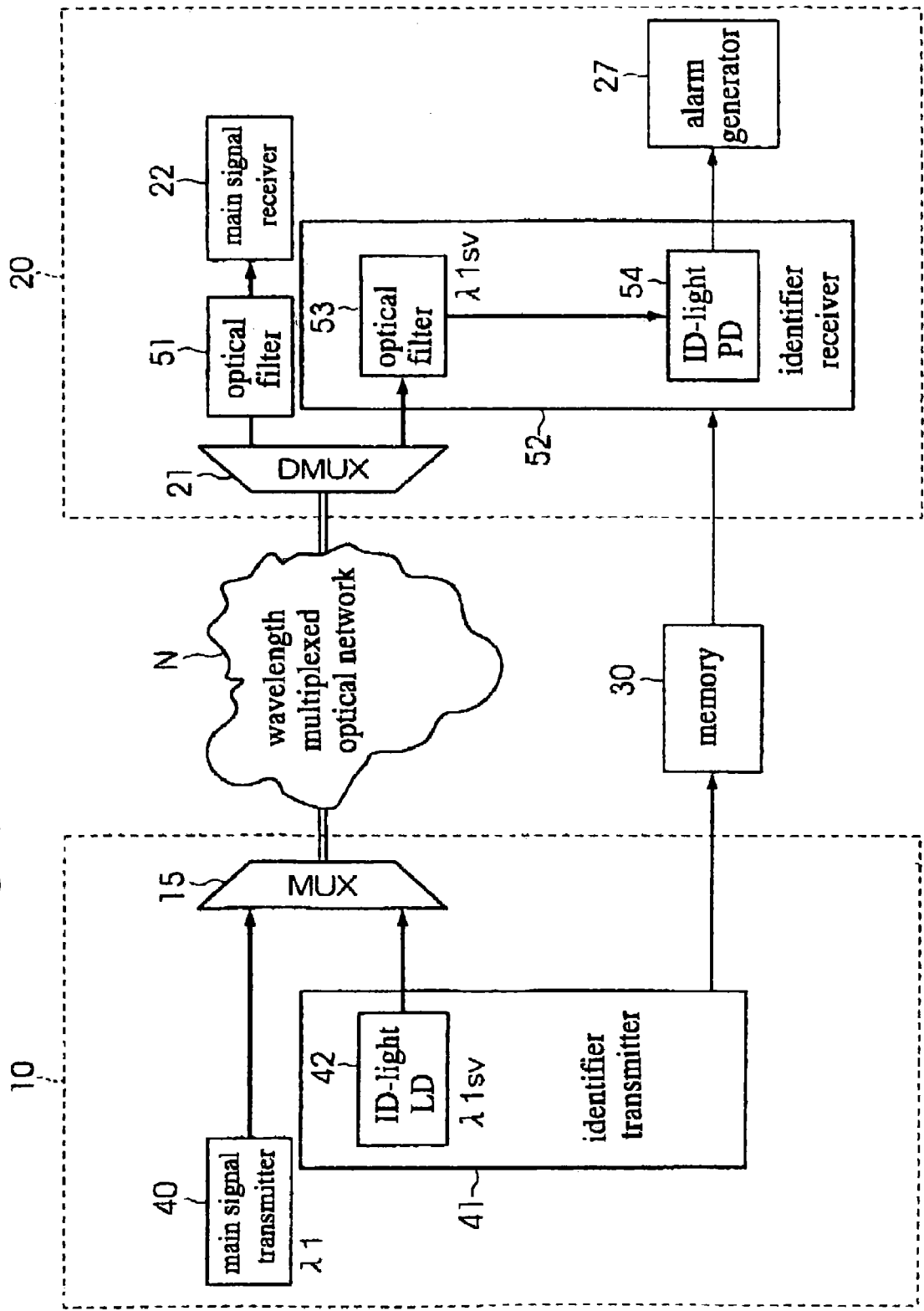
FIG. 3 is a block diagram illustrative of an optical signal transmission system including an optical signal transmitter and an optical signal receiver which are optically coupled to each other through a wavelength-multiplexed optical network in a third embodiment in accordance with the present invention.

A third embodiment according to the present invention will be described in detail with reference to the drawings. FIG. 3 is a block diagram illustrative of an optical signal transmission system including an optical signal transmitter and an optical signal receiver which are optically coupled to each other through a wavelength-multiplexed optical network. In this embodiment, the optical signal transmission system is configured to allow that the optical identifier transmitted from the optical identifier transmitter is not frequency-modulated but the optical identifier has a fixed wavelength which is unique to and different from the wavelength of the main optical signal.

An optical signal transmission system includes an optical signal transmitter 10 and an optical signal receiver 20 which are optically coupled to each other through a wavelength-multiplexed optical network N. The optical signal transmission system further includes a memory 30 which is coupled to both the optical signal transmitter 10 and the optical signal receiver 20. This optical signal transmission system is configured to transmit only a main optical signal with a fixed single wavelength from the optical signal transmitter 10 through the wavelength-multiplexed optical network N to the optical signal receiver 20.

The optical signal transmitter 10 may further include a main optical signal transmitter 40, an optical identifier transmitter 41, and a wavelength-multiplexer 15. The main optical signal transmitter 40 has the same configuration as the main optical signal transmitter 11 shown in FIG. 1 but emits or transmits a main optical signal with a wavelength "λ1" to the wavelength-multiplexer 15. The optical identifier transmitter 41 transmits an optical identifier which is to identify the main optical signal transmitted from the main optical signal transmitter 40. The optical identifier transmitter 41 may further include an optical identifier emitting device 42 which may be realized by a laser diode which emits a laser beam as the optical identifier.

The optical identifier emitting device 42 emits an optical identifier which comprises a laser beam with a wavelength "λ1sv" which is different from the wavelength "λ1" of the main optical signal. The optical identifier with the wavelength "λ1sv" is also transmitted to the wavelength-multiplexer 15.

The optical identifier transmitter 41 also supplies the memory 30 with corresponding data which show a relationship in correspondence between the wavelength "λ1" of the main optical signal outputted from the main optical signal transmitter 40, and the wavelength "λ1sv" of the optical identifier outputted from the optical identifier transmitter 41.

The wavelength-multiplexer 15 performs a wavelength-multiplexing of the main optical signal outputted from the main optical signal transmitter 40 and the optical identifier outputted from the optical identifier transmitter 41 and transmits a wavelength-multiplexed optical signal through the wavelength-multiplexed optical network N.

The wavelength-multiplexed optical network N allows transmissions of wavelength-multiplexed lights.

The memory 30 stores the above corresponding data from the optical identifier transmitter 41. The memory 30 may be realized by any available devices, typical examples of which may include, but not limited to, various semiconductor memory devices, various magnetic recording devices such as hard-disk devices, various optical magnetic recording devices, and various recording mediums.

The optical signal receiver 20 may include a wavelength-demultiplexer 21, a first optical filter 51, a main optical signal receiver 22, an optical identifier receiver 52, and an alarm generator 27.

The wavelength-demultiplexer 21 receives the wavelength-multiplexed signal transmitted through the wavelength-multiplexed optical network N, and performs a wavelength-demultiplexing of the wavelength-multiplexed signal into the main optical signal and the optical identifier, so that the wavelength-demultiplexer 21 transmits the main optical signal to the main optical signal receiver 22 and also transmits the optical identifier to the optical identifier receiver 52.

The first optical filter 51 receives the main optical signal from the wavelength-demultiplexer 21. The first optical filter 51 performs a wavelength-filtering which allows a selective transmission of a light with the wavelength "λ1" only, but cuts off any other lights with any other wavelengths. The main optical signal receiver 22 thus receives the main optical signal with the wavelength "λ1" wavelength-filtered by the first optical filter 51.

The optical identifier receiver 52 receives the optical identifier from the wavelength-demultiplexer 21, so that the optical identifier receiver 52 performs a wavelength-filtering which allows a selective transmission of the optical identifier with the wavelength "λ1sv" only but cuts off any other optical identifiers with the other wavelengths, and detects the optical identifier with the wavelength "λ1sv" corresponding to the main optical signal with the wavelength "λ1" for comparing the detected relationship between the wavelength "λ1sv" of the optical identifier and the wavelength "λ1" of the main optical signal to the relationship included in the corresponding data. The optical identifier receiver 52 may further include a second optical filter 53 and an optical identifier detector 54. The second optical filter 53 performs a wavelength-filtering which allows a selective transmission of the optical identifier with the wavelength "λ1sv" only but cuts off any other optical identifiers with the other wavelengths. The optical identifier detector 54 receives the optical identifier with the wavelength "λ1sv" transmitted through the second optical filter 53 and detects the optical identifier with the wavelength "λ1sv" corresponding to the main optical signal with the wavelength "λ1" for comparing the detected relationship between the wavelength "λ1sv" of the optical identifier and the wavelength "λ1" of the main optical signal to the relationship included in the corresponding data. The optical identifier detector 54 may be realized by a photo-detector PD which receives and detects the optical identifier. The optical identifier detector 54 sends the wavelength-comparison result to the alarm generator 27.

The alarm generator 27 generates an alarm based on the wavelength-comparison result, if the wavelength-comparison result is that the detected relationship between the wavelength "λ1sv" of the optical identifier and the wavelength "λ1" of the main optical signal is different from the stored relationship included in the corresponding data supplied from the memory 30. The difference of the relationships represents that the undesired or unintended incorrect connection or route is established in the wavelength-multiplexed optical network N. Namely, the generated alarm alerts that the undesired or unintended incorrect connection or route is established in the wavelength-multiplexed optical network N.

The alarm generator 27 generates no alarm based on the wavelength-comparison result, if the wavelength-comparison result is that the detected relationship between the wavelength "λ1sv" of the optical identifier and the wavelength "λ1" of the main optical signal is identical with the stored relationship included in the corresponding data supplied from the memory 30. The identity of the relationships represents that the undesired or unintended incorrect connection or route is established in the wavelength-multiplexed optical network N. Namely, no generation of alarm notifies that the desired or intended correct connection or route is established in the wavelength-multiplexed optical network N.

Subsequent descriptions will focus on operations of the optical signal transmission system, the optical signal transmitter and the optical signal receiver. Namely, methods of transmitting and receiving the optical signals will be described with reference continuously to FIG. 3.

As described above, the optical signal transmission system is configured to transmit only a main optical signal with a fixed single wavelength from the optical signal transmitter 10 through the wavelength-multiplexed optical network N to the optical signal receiver 20.

The main optical signal with a wavelength "λ1" is transmitted from the main optical signal transmitter 40 to the wavelength-multiplexer 15. Further, the optical identifier is transmitted from the optical identifier transmitter 41 to the wavelength-multiplexer 15, wherein the optical identifier has the wavelength "λ1sv". The main optical signal and the optical identifier are wavelength-multiplexed by the wavelength-multiplexer 15, and the wavelength-multiplexed optical signal is then outputted from the wavelength-multiplexer 15 and transmitted through the wavelength-multiplexed optical network N.

On the other hand, the optical identifier transmitter 41 also supplies the memory 30 with corresponding data which show a relationship in correspondence between the wavelength "λ1" of the main optical signal outputted from the main optical signal transmitter 40, and the wavelength "λ1sv" of the optical identifier outputted from the optical identifier transmitter 41.

The wavelength-multiplexed signal transmitted through the wavelength-multiplexed optical network N is then received by the wavelength-demultiplexer 21, so that the wavelength-multiplexed signal is demultiplexed by the wavelength-demultiplexer 21 into the main optical signal and the optical identifier. The main optical signal is wavelength-filtered by the first optical filter 51, so that the main optical signal with the wavelength "λ1" is transmitted through the first optical filter 51 to the main optical signal receiver 22. The optical identifier is also wavelength-filtered by the second optical filter 53, so that the optical identifier with the wavelength "λ1sv" is then detected by the optical identifier detector 54 in the optical identifier receiver 52.

As described above, the optical identifier received by the optical identifier detector 54 has the wavelength "λ1sv". For this reason, the detected relationship between the wavelength "λ1sv" of the optical identifier and the wavelength "λ1" of the main optical signal is identical with the stored relationship included in the corresponding data supplied from the memory 30 if the intended or correct connection or route is established in the wavelength-multiplexed optical network N. The wavelength-comparison result is sent from the optical identifier detector 54 to the alarm generator 27.

An alarm is generated by the alarm generator 27 based on the wavelength-comparison result, if the wavelength-comparison result is that the detected relationship between the wavelength "λ1sv" of the optical identifier and the wavelength "λ1" of the main optical signal is different from the stored relationship included in the corresponding data supplied from the memory 30. The difference of the relationships represents that the undesired or unintended incorrect connection or route is established in the wavelength-multiplexed optical network N. Namely, the generated alarm alerts that the undesired or unintended incorrect connection or route is established in the wavelength-multiplexed optical network N.

No alarm is generated by the alarm generator 27 based on the wavelength-comparison result, if the wavelength-comparison result is that the detected relationship between the wavelength "λ1sv" of the optical identifier and the wavelength "λ1" of the main optical signal is identical with the stored relationship included in the corresponding data supplied from the memory 30. The identity of the relationships represents that the undesired or unintended incorrect connection or route is established in the wavelength-multiplexed optical network N. Namely, no generation of alarm notifies that the desired or intended correct connection or route is established in the wavelength-multiplexed optical network N.

The wavelength-multiplexed optical network N has a large number of routes for transmissions of the wavelength-multiplexed optical signals including the main optical signal and the optical identifier. This wavelength-multiplexed optical network N allows wavelength-multiplexing independently from the signal transmission rate and the transmission signal format, for which reason, the above-described conventional method of using the overhead applied to the synchronous digital hierarchy network is not applicable in order to monitor any undesired or unintended connection or route established in the wavelength-multiplexed optical network N.

In accordance with this embodiment, the transmitter performs the following operations. The main optical signal is wavelength-multiplexed with the optical identifier to generate the wavelength-multiplexed optical signal which is then transited through the wavelength-multiplexed optical network N without any frequency modulation to the main optical signal. In parallel to this wavelength-multiplexed optical signal transmission without any frequency modulation to the main optical signal, the corresponding data are generated, which show a relationship in correspondence between the wavelength "λ1" of the main optical signal outputted from the main optical signal transmitter 40, and the wavelength "λ1sv" of the optical identifier outputted from the optical identifier transmitter 41.

The wavelength-multiplexed optical signal is transmitted through the wavelength-multiplexed optical network N from the optical signal transmitter to the optical signal receiver.

The receiver performs the following operations. The wavelength-multiplexed optical signal is wavelength-demultiplexed into the main optical signal and the optical identifier. In parallel, the corresponding data are received from the transmitter, so that the detected relationships between the detected main optical signal and the detected optical identifier is compared to the reference relationship included in the corresponding data. The identity of the relationships means that the intended or desired correct connection or route is established in the wavelength-multiplexed optical network N. The difference of the relationships means that the unintended or undesired incorrect connection or route is established in the wavelength-multiplexed optical network N. The monitoring to the correspondence between the optical signal transmitter and the optical signal receiver through the wavelength-multiplexed optical network N is accomplished with no frequency modulation to the main optical signal. No frequency modulation to the main optical signal causes no deterioration in quality of the main optical signal. Further, the wavelength-demultiplexed main optical signal is not subjected to any photo-electric conversion.

The optical identifier transmitter 41 may be coupled to the memory 30 through any available connection interface. The optical identifier receiver 52 may also be coupled to the memory 30 through any available connection interface. Typical examples of the available connection interface may include, but not limited to, any dedicated optical lines, and any dedicated electrical lines such as Ethernet (registered trademark).

As described above, the optical identifier transmitter 41 generates the corresponding data which show a relationship in correspondence between the wavelength "λ1" of the main optical signal outputted from the main optical signal transmitter 40, and the wavelength "λ1sv" of the optical identifier outputted from the optical identifier transmitter 41. The corresponding data are sent to the memory 30 and then stored in the memory 30, so that the optical identifier receiver 52 reads the corresponding data out of the memory 30.

As a modification to this embodiment, it is possible that the fixed corresponding data are previously stored in each of the optical identifier transmitter 41 and the optical identifier receiver 52 without using the memory 30.

As described above, the memory 30 may be realized by any available storing means, typical examples of which may include, but not limited to, various semiconductor memory devices, various magnetic recording devices such as hard-disk devices, various optical magnetic recording devices, various recording mediums, and any available data management stations or centers. The memory 30 may be placed at a single location or distributed.

As a modification to this embodiment, it is possible to use an arrayed waveguide grating instead of a set of the wavelength-demultiplexer 21, and the first and second optical filters 51 and 53 because the arrayed waveguide grating performs substantially the same function as the function of the set of the wavelength-demultiplexer 21, and the first and second optical filters 51 and 53.

Fourth Embodiment

Figure 4:
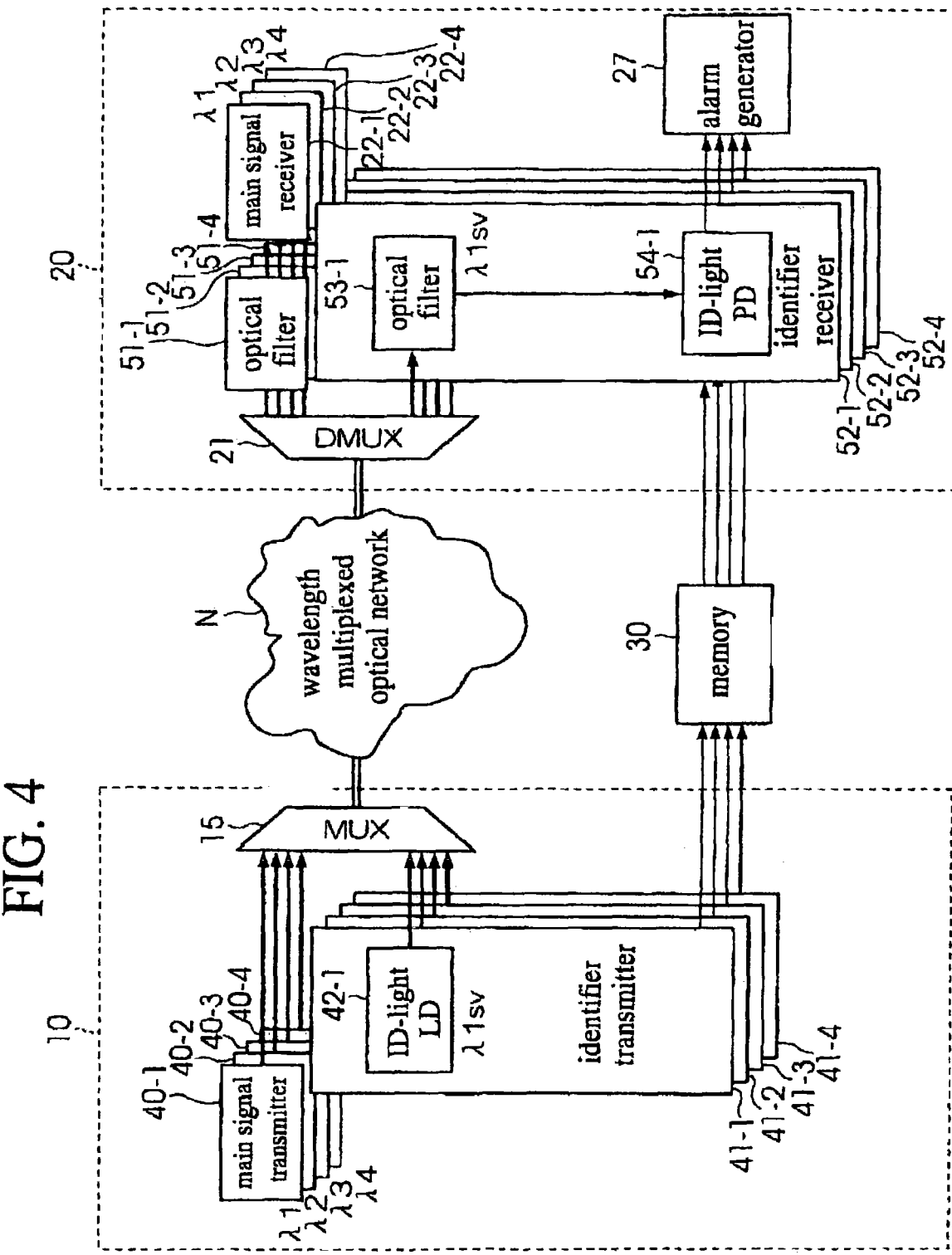
FIG. 4 is a block diagram illustrative of an optical signal transmission system including an optical signal transmitter and an optical signal receiver which are optically coupled to each other through a wavelength-multiplexed optical network in a fourth embodiment in accordance with the present invention.

A fourth embodiment according to the present invention will be described in detail with reference to the drawings. FIG. 4 is a block diagram illustrative of an optical signal transmission system including an optical signal transmitter and an optical signal receiver which are optically coupled to each other through a wavelength-multiplexed optical network. In this embodiment, the optical signal transmission system is configured to allow that the plural optical identifiers transmitted from the plural optical identifier transmitters are not frequency-modulated but the plural optical identifier has fixed wavelengths which are unique to and different from the wavelengths of the plural main optical signal.

An optical signal transmission system includes an optical signal transmitter 10 and an optical signal receiver 20 which are optically coupled to each other through a wavelength-multiplexed optical network N. The optical signal transmission system further includes a memory 30 which is coupled to both the optical signal transmitter 10 and the optical signal receiver 20. This optical signal transmission system is configured to transmit plural main optical signals with plural different wavelengths from the optical signal transmitter 10 through the wavelength-multiplexed optical network N to the optical signal receiver 20.

The optical signal transmitter 10 may further include first to fourth main optical signal transmitters 40-1, 40-2, 40-3 and 40-4, first to fourth optical identifier transmitters 41-1, 41-2, 41-3 and 41-4, and a wavelength-multiplexer 15. The first to fourth main optical signal transmitters 40-1, 40-2, 40-3 and 40-4 have the same configuration as the main optical signal transmitter 11 shown in FIG. 1 but emit or transmit first to fourth main optical signals with first to fourth wavelengths "λ1", "λ2", "λ3" and "λ4" to the wavelength-multiplexer 15. The first to fourth optical identifier transmitters 41-1, 41-2, 41-3 and 41-4 transmit first to fourth optical identifiers which are to identify the first to fourth main optical signals transmitted from the first to fourth main optical signal transmitters 40-1, 40-2, 40-3 and 40-4, respectively. The first to fourth optical identifier transmitters 41-1, 41-2, 41-3 and 41-4 may further include first to fourth optical identifier emitting device 42-1, 42-2, 42-3, and 42-4, respectively, each of which may be realized by a laser diode which emits a laser beam as the optical identifier.

The first to fourth optical identifier emitting device 42-1, 42-2, 42-3, and 42-4 emit first to fourth optical identifiers which comprise first to fourth laser beams with first to fourth wavelengths "λ1sv", "λ2sv", "λ3sv" and "λ4sv" which are different from the first to fourth wavelengths "λ1", "λ2", "λ3" and "λ4" of the first to fourth main optical signals. The first to fourth optical identifiers with the first to fourth wavelengths "λ1sv", "λ2sv", "λ3sv" and "λ4sv" are also transmitted to the wavelength-multiplexer 15.

The first to fourth optical identifier transmitters 41-1, 41-2, 41-3 and 41-4 also supply the memory 30 with first to fourth corresponding data which show first to fourth relationships in correspondence between the first to fourth wavelengths "λ1", "λ2", "λ3" and "λ4" of the first to fourth main optical signals outputted from the first to fourth main optical signal transmitters 40-1, 40-2, 40-3 and 40-4, and the first to fourth wavelengths "λ1sv", "λ2sv", "λ3" and "λ4sv" of the first to fourth optical identifiers outputted from the first to fourth optical identifier transmitters 41-1, 41-2, 41-3 and 41-4.

The wavelength-multiplexer 15 performs a wavelength-multiplexing of the first to fourth main optical signals outputted from the first to fourth main optical signal transmitters 40-1, 40-2, 40-3 and 40-4 and the first to fourth optical identifiers outputted from the first to fourth optical identifier transmitters 41-1, 41-2, 41-3 and 41-4 and transmits a wavelength-multiplexed optical signal through the wavelength-multiplexed optical network N.

The wavelength-multiplexed optical network N allows transmissions of wavelength-multiplexed lights.

The memory 30 stores the above first to fourth corresponding data from the first to fourth optical identifier transmitters 41-1, 41-2, 41-3 and 41-4. The memory 30 may be realized by any available devices, typical examples of which may include, but not limited to, various semiconductor memory devices, various magnetic recording devices such as hard-disk devices, various optical magnetic recording devices, and various recording mediums.

The optical signal receiver 20 may include a wavelength-demultiplexer 21, first to fourth optical filters 51-1, 51-2, 51-3 and 51-4, first to fourth main optical signal receivers 22-1, 22-2, 22-3 and 22-4, first to fourth optical identifier receivers 52-1, 52-2, 52-3 and 52-4, and an alarm generator 27.

The wavelength-demultiplexer 21 receives the wavelength-multiplexed signal transmitted through the wavelength-multiplexed optical network N, and performs a wavelength-demultiplexing of the wavelength-multiplexed signal into the first to fourth main optical signals and the first to fourth optical identifiers, so that the wavelength-demultiplexer 21 transmits the first to fourth main optical signals to the first to fourth main optical signal receivers 22-1, 22-2, 22-3 and 22-4, respectively and also transmits the first to fourth optical identifiers to the first to fourth optical identifier receivers 52-1, 52-2, 52-3 and 52-4.

The first to fourth optical filters 51-1, 51-2, 51-3 and 51-4 receive the main optical signal from the wavelength-demultiplexer 21. The first to fourth optical filters 51-1, 51-2, 51-3 and 51-4 perform wavelength-filtering which allow selective transmissions of lights with the first to fourth wavelengths "λ1", "λ2", "λ3" and "λ4" only, but cuts off any other lights with any other wavelengths. The first to fourth main optical signal receivers 22-1, 22-2, 22-3 and 22-4 thus receive the first to fourth main optical signals with the first to fourth wavelengths "λ1", "λ2", "λ3" and "λ4" wavelength-filtered by the first to fourth optical filters 51-1, 51-2, 51-3 and 51-4, respectively.

The first to fourth optical identifier receivers 52-1, 52-2, 52-3 and 52-4 receive the first to fourth optical identifiers from the wavelength-demultiplexer 21, so that the first to fourth optical identifier receivers 52-1, 52-2, 52-3 and 52-4 perform wavelength-filtering which allow selective transmissions of the first to fourth optical identifiers with the first to fourth wavelengths "λ1sv", "λ2sv", "λ3sv" and "λ4sv" only but cut off any other optical identifiers with the other wavelengths, and detect the first to fourth optical identifiers with the first to fourth wavelengths "λ1sv", "λ2sv", "λ3sv" and "λ4sv" corresponding to the first to fourth main optical signals with the first to fourth wavelengths "λ1", "λ2", "λ3" and "λ4" for comparing the detected relationship between the first to fourth wavelengths "λ1sv", "λ2sv", "λ3sv" and "λ4sv" of the first to fourth optical identifiers and the first to fourth wavelengths "λ1", "λ2", "λ3" and "λ4" of the first to fourth main optical signals to the first to fourth relationships included in the first to fourth corresponding data. The first to fourth optical identifier receivers 52-1, 52-2, 52-3 and 52-4 may further include fifth to eighth optical filters 53-1, 53-2, 53-3, 53-4 and first to fourth optical identifier detectors 54-1, 54-2, 54-3, and 54-4. The fifth to eighth optical filters 53-1, 53-2, 53-3, 53-4 perform wavelength-filtering which allow selective transmissions of the optical identifiers with the first to fourth wavelengths "λ1sv", "λ2sv", "λ3sv" and "λ4sv" only but cut off any other optical identifiers with the other wavelengths. The first to fourth optical identifier detectors 54-1, 54-2, 54-3, and 54-4 receive the first to fourth optical identifiers with the wavelengths "λ1sv", "λ2sv", "λ3sv" and "λ4sv" transmitted through the fifth to eighth optical filters 53-1, 53-2, 53-3, 53-4 and detect the first o fourth optical identifiers with the first to fourth wavelengths "λ1sv", "λ2sv", "λ3sv" and "λ4sv" corresponding to the first to fourth main optical signal with the first to fourth wavelengths "λ1", "λ2", "λ3" and "λ4" for comparing the detected relationships between the first to fourth wavelengths "λ1sv", "λ2sv", "λ3sv" and "λ4sv" of the first to fourth optical identifiers and the first to fourth wavelengths "λ1", "λ2", "λ3" and "λ4" of the first to fourth main optical signals to the first to fourth relationships included in the first to fourth corresponding data. Each of the first to fourth optical identifier detectors 54-1, 54-2, 54-3, and 54-4 may be realized by a photo-detector PD which receives and detects the optical identifier. The first to fourth optical identifier detectors 54-1, 54-2, 54-3, and 54-4 send the first to fourth wavelength-comparison results to the alarm generator 27.

The alarm generator 27 generates an alarm based on the first to fourth wavelength-comparison results, if any one of the first to fourth wavelength-comparison results is that the detected relationship between the relationships between the first to fourth wavelengths "λ1sv", "λ2sv", "λ3sv" and "λ4sv" of the first to fourth optical identifiers and the first to fourth wavelengths "λ1", "λ2", "λ3" and "λ4" of the first to fourth main optical signals are different from the stored first to fourth relationships included in the first to fourth corresponding data supplied from the memory 30. The difference of the relationships represents that the undesired or unintended incorrect connection or route is established in the wavelength-multiplexed optical network N. Namely, the generated alarm alerts that the undesired or unintended incorrect connection or route is established in the wavelength-multiplexed optical network N.

The alarm generator 27 generates no alarm based on the wavelength-comparison result, if the wavelength-comparison result is that the detected first to fourth relationships between the first to fourth wavelengths "λ1sv", "λ2sv", "λ3sv" and "λ4sv" of the first to fourth optical identifiers and the first to fourth wavelengths "λ1", "λ2", "λ3" and "λ4" of the first to fourth main optical signals are identical with the stored first to fourth relationships included in the first to fourth corresponding data supplied from the memory 30. The identity of the relationships represents that the undesired or unintended incorrect connection or route is established in the wavelength-multiplexed optical network N. Namely, no generation of alarm notifies that the desired or intended correct connection or route is established in the wavelength-multiplexed optical network N.

Subsequent descriptions will focus on operations of the optical signal transmission system, the optical signal transmitter and the optical signal receiver. Namely, methods of transmitting and receiving the optical signals will be described with reference continuously to FIG. 4.

As described above, the optical signal transmission system is configured to transmit first to fourth main optical signals with fixed first to fourth wavelengths from the optical signal transmitter 10 through the wavelength-multiplexed optical network N to the optical signal receiver 20.

The first to fourth main optical signals with first to fourth wavelengths "λ1", "λ2", "λ3" and "λ4" are transmitted from the first to fourth main optical signal transmitters 40-1, 40-2, 40-3 and 40-4 to the wavelength-multiplexer 15. Further, the first to fourth optical identifiers are transmitted from the first to fourth optical identifier transmitters 41-1, 41-2, 41-3 and 41-4 to the wavelength-multiplexer 15, wherein the optical identifier has the wavelengths "λ1sv", "λ2sv", "λ3sv" and "λ4sv". The main optical signal and the optical identifier are wavelength-multiplexed by the wavelength-multiplexer 15, and the wavelength-multiplexed optical signal is then outputted from the wavelength-multiplexer 15 and transmitted through the wavelength-multiplexed optical network N.

On the other hand, the first to fourth optical identifier transmitters 41-1, 41-2, 41-3 and 41-4 also supplies the memory 30 with corresponding data which show a relationship in correspondence between the first to fourth wavelengths "λ1", "λ2", "λ3" and "λ4" of the main optical signal outputted from the first to fourth main optical signal transmitters 40-1, 40-2, 40-3 and 40-4, and the first to fourth wavelengths "λ1sv", "λ2sv", "λ3sv" and "λ4sv" of the first to fourth optical identifiers outputted from the first to fourth optical identifier transmitters 41-1, 41-2, 41-3 and 41-4.

The wavelength-multiplexed signal transmitted through the wavelength-multiplexed optical network N is then received by the wavelength-demultiplexer 21, so that the wavelength-multiplexed signal is demultiplexed by the wavelength-demultiplexer 21 into the first to fourth main optical signals and the first to fourth optical identifiers. The first to fourth main optical signals are wavelength-filtered by the first to fourth optical filters 51-1, 51-2, 51-3 and 51-4, so that the first to fourth main optical signals with the first to fourth wavelengths "λ1", "λ2", "λ3" and "λ4" are transmitted through the first to fourth optical filters 51-1, 51-2, 51-3 and 51-4 to the first to fourth main optical signal receivers 22-1, 22-2, 22-3 and 22-4. The first to fourth optical identifiers are also wavelength-filtered by the fifth to eighth optical filters 53-1, 53-2, 53-3, 53-4, so that the first to fourth optical identifiers with the first to fourth wavelengths "λ1sv", "λ2sv", "λ3sv" and "λ4sv" are then detected by the first to fourth optical identifier detectors 54-1, 54-2, 54-3, and 54-4 in the first to fourth optical identifier receivers 52-1, 52-2, 52-3 and 52-4.

As described above, the first to fourth optical identifiers received by the first to fourth optical identifier detectors 54-1, 54-2, 54-3, and 54-4 have the first to fourth wavelengths "λ1sv", "λ2sv", "λ3sv" and "λ4sv". For this reason, the detected first to fourth relationships between the first to fourth wavelengths "λ1sv", "λ2sv", "λ3sv" and "λ4sv" of the first to fourth optical identifiers and the first to fourth wavelengths "λ1", "λ2", "λ3" and "λ4" of the first to fourth main optical signals are identical with the stored first to fourth relationships included in the first to fourth corresponding data supplied from the memory 30 if the intended or correct connection or route is established in the wavelength-multiplexed optical network N. The first to fourth wavelength-comparison results are sent from the first to fourth optical identifier detectors 54-1, 54-2, 54-3, and 54-4 to the alarm generator 27.

An alarm is generated by the alarm generator 27 based on the first to fourth wavelength-comparison results, if at least one of the first to fourth wavelength-comparison results is that the detected first to fourth relationships between the first to fourth wavelengths "λ1sv", "λ2sv", "λ3sv" and "λ4sv" of the first to fourth optical identifiers and the first to fourth wavelengths "λ1", "λ2", "λ3" and "λ4" of the first to fourth main optical signals is different from the stored relationship included in the corresponding data supplied from the memory 30. The difference of the relationships represents that the undesired or unintended incorrect connection or route is established in the wavelength-multiplexed optical network N. Namely, the generated alarm alerts that the undesired or unintended incorrect connection or route is established in the wavelength-multiplexed optical network N.

No alarm is generated by the alarm generator 27 based on the first to fourth wavelength-comparison results, if all of the first to fourth wavelength-comparison results are that the detected first to fourth relationships between the first to fourth wavelengths "λ1sv", "λ2sv", "λ3sv" and "λ4sv" of the first to fourth optical identifiers and the first to fourth wavelengths "λ1", "λ2", "λ3" and "λ4" of the first to fourth main optical signals are identical with the stored first to fourth relationships included in the first to fourth corresponding data supplied from the memory 30. The identity of the relationships represents that the undesired or unintended incorrect connection or route is established in the wavelength-multiplexed optical network N. Namely, no generation of alarm notifies that the desired or intended correct connection or route is established in the wavelength-multiplexed optical network N.

The wavelength-multiplexed optical network N has a large number of routes for transmissions of the wavelength-multiplexed optical signals including the main optical signal and the optical identifier. This wavelength-multiplexed optical network N allows wavelength-multiplexing independently from the signal transmission rate and the transmission signal format, for which reason, the above-described conventional method of using the overhead applied to the synchronous digital hierarchy network is not applicable in order to monitor any undesired or unintended connection or route established in the wavelength-multiplexed optical network N.

In accordance with this embodiment, the transmitter performs the following operations. The first to fourth main optical signals are wavelength-multiplexed with the first to fourth optical identifiers to generate the wavelength-multiplexed optical signal which is then transited through the wavelength-multiplexed optical network N without any frequency modulation to the main optical signal. In parallel to this wavelength-multiplexed optical signal transmission without any frequency modulation to the main optical signal, the first to fourth corresponding data are generated, which show first to fourth relationships in correspondence between the first to fourth wavelengths "λ1", "λ2", "λ3" and "λ4" of the first to fourth main optical signals outputted from the first to fourth main optical signal transmitters 40-1, 40-2, 40-3 and 40-4, and the first to fourth wavelengths "λ1sv", "λ2sv", "λ3sv" and "λ4sv" of the first to fourth optical identifiers outputted from the first to fourth optical identifier transmitters 41-1, 41-2, 41-3 and 41-4.

The wavelength-multiplexed optical signal is transmitted through the wavelength-multiplexed optical network N from the optical signal transmitter to the optical signal receiver.

The receiver performs the following operations. The wavelength-multiplexed optical signal is wavelength-demultiplexed into the main optical signal and the optical identifier. In parallel, the corresponding data are received from the transmitter, so that the detected relationships between the detected main optical signals and the detected optical identifiers are compared to the reference relationships included in the corresponding data. The identity of the relationships means that the intended or desired correct connection or route is established in the wavelength-multiplexed optical network N. The difference of the relationships means that the unintended or undesired incorrect connection or route is established in the wavelength-multiplexed optical network N. The monitoring to the correspondence between the optical signal transmitter and the optical signal receiver through the wavelength-multiplexed optical network N is accomplished with no frequency modulation to the main optical signal. No frequency modulation to the main optical signal causes no deterioration in quality of the main optical signal. Further, the wavelength-demultiplexed main optical signal is not subjected to any photo-electric conversion.

The first to fourth optical identifier transmitters 41-1, 41-2, 41-3 and 41-4 may be coupled to the memory 30 through any available connection interface. The first to fourth optical identifier receivers 52-1, 52-2, 52-3 and 52-4 may also be coupled to the memory 30 through any available connection interface. Typical examples of the available connection interface may include, but not limited to, any dedicated optical lines, and any dedicated electrical lines such as Ethernet (registered trademark).

As described above, the first to fourth optical identifier transmitters 41-1, 41-2, 41-3 and 41-4 generate the first to fourth corresponding data which show first to fourth relationships in correspondence between the first to fourth wavelengths "λ1", "λ2", "λ3" and "λ4" of the first to fourth main optical signals outputted from the first to fourth main optical signal transmitters 40-1, 40-2, 40-3 and 40-4, and the first to fourth wavelengths "λ1sv""λ2sv", "λ3sv" and "λ4sv" of the first to fourth optical identifiers outputted from the first to fourth optical identifier transmitters 41-1, 41-2, 41-3 and 41-4. The corresponding data are sent to the memory 30 and then stored in the memory 30, so that the first to fourth optical identifier receivers 52-1, 52-2, 52-3 and 52-4 read the corresponding data out of the memory 30.

As a modification to this embodiment, it is possible that the fixed corresponding data are previously stored in each of the first to fourth optical identifier transmitters 41-1, 41-2, 41-3 and 41-4 and the first to fourth optical identifier receivers 52-1, 52-2, 52-3 and 52-4 without using the memory 30.

As described above, the memory 30 may be realized by any available storing means, typical examples of which may include, but not limited to, various semiconductor memory devices, various magnetic recording devices such as hard-disk devices, various optical magnetic recording devices, various recording mediums, and any available data management stations or centers. The memory 30 may be placed at a single location or distributed.

As a modification to this embodiment, it is possible to use an arrayed waveguide grating instead of a set of the wavelength-demultiplexer 21, and the first to eighth optical filters 51-1, 51-2, 51-3, 51-4, 53-1, 53-2, 53-3 and 53-4 because the arrayed waveguide grating performs substantially the same function as the function of the set of the wavelength-demultiplexer 21, and the first to eighth optical filters 51-1, 51-2, 51-3, 51-4, 53-1, 53-2, 53-3 and 53-4.

Fifth Embodiment

Figure 5:
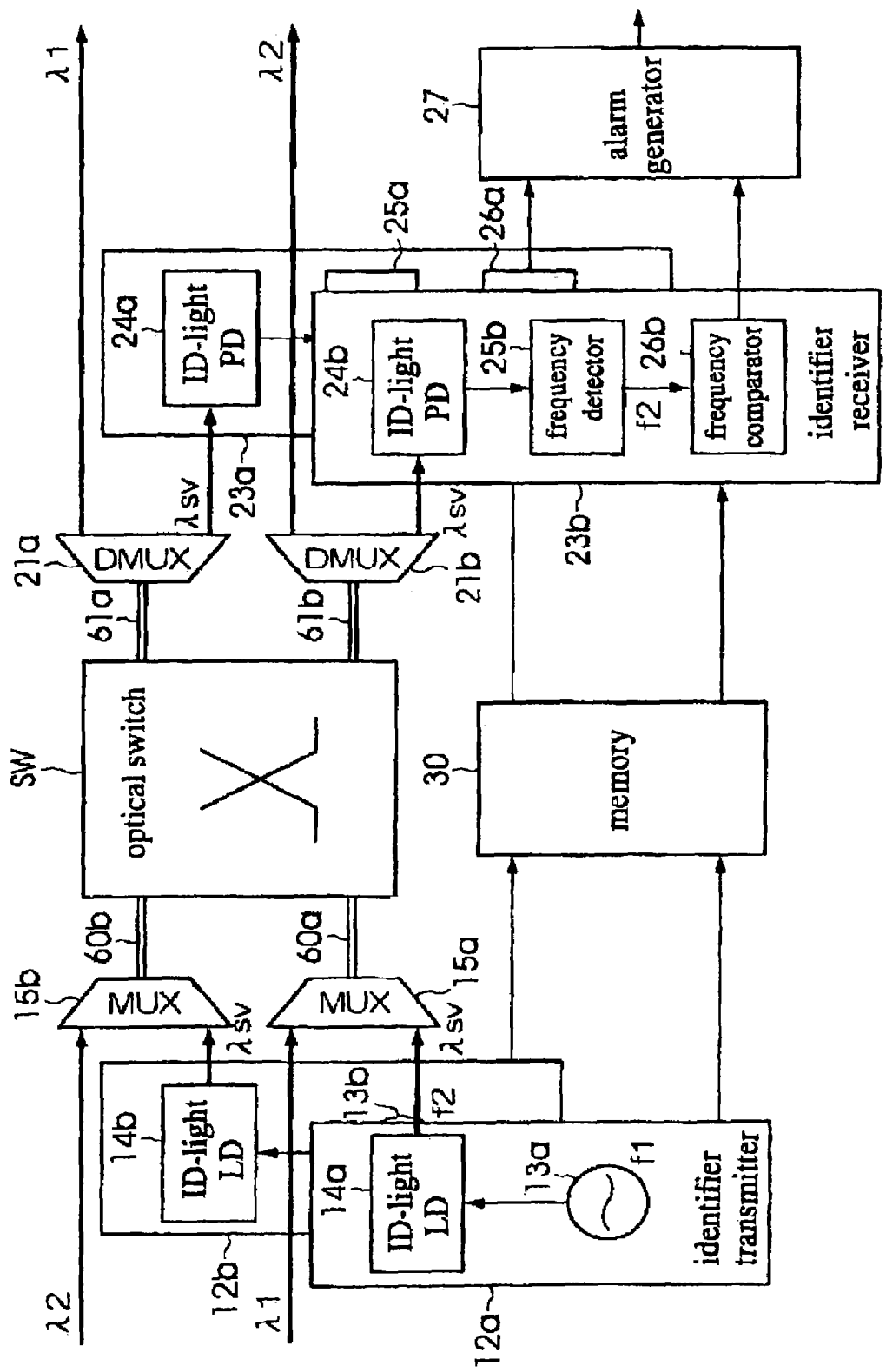
FIG. 5 is a block diagram illustrative of an optical signal transmission system including an optical signal transmitter and an optical signal receiver which are optically coupled to each other through an optical switch in a fifth embodiment in accordance with the present invention.

A fifth embodiment according to the present invention will be described in detail with reference to the drawings. FIG. 5 is a block diagram illustrative of an optical signal transmission system including an optical signal transmitter and an optical signal receiver which are optically coupled to each other through an optical switch.

An optical signal transmission system includes an optical signal transmitter and an optical signal receiver which are optically coupled to each other through an optical switch SW. The optical signal transmission system further includes a memory 30 which is coupled to both the optical signal transmitter and the optical signal receiver. This optical signal transmission system is configured to transmit first and second main optical signals with fixed first and second wavelengths from the optical signal transmitter through the optical switch SW to the optical signal receiver.

The optical switch SW has first and second inputs and first and second outputs. The optical switch SW switches routes among the first and second inputs and the first and second outputs.

A first main optical signal with a first wavelength "λ1" is transmitted from a first main optical signal transmitter to a first wavelength-multiplexer 15a. A first optical identifier with a first wavelength "λsv" frequency-modulated at a first frequency "f1" is also transmitted from a first optical identifier transmitter 12a to the first wavelength-multiplexer 15a. The first main optical signal transmitter has the same configuration as the main optical signal transmitter 11 shown in FIG. 1, except that the first main optical signal transmitter transmits the first main optical signal with the first wavelength "λ1". The first optical identifier transmitter 12a also has the same configuration as the optical identifier transmitter 12 shown in FIG. 1, except that the first optical identifier transmitter 12a transmits the first optical identifier with the wavelength "λsv" which corresponds to the first wavelength "λ1" of the first main optical signal, wherein the first optical identifier is frequency-modulated at the first frequency "f1".

The first wavelength-multiplexer 15a performs wavelength-multiplexing of the first main optical signal and the first optical identifier to generate a first wavelength-multiplexed optical signal. The first wavelength-multiplexer 15a is optically connected through a first optical fiber 60a to the first input of the optical switch SW. The first wavelength-multiplexed optical signal is then transmitted through the first optical fiber 60a to the first input of the optical switch SW.

The first optical identifier transmitter 12a also supplies the memory 30 with first corresponding data which show a first relationship in correspondence between the first wavelength "λ1" of the first main optical signal outputted from the first main optical signal transmitter, and a first electric frequency component of the first frequency "f1" corresponding to the first main optical signal.

A second main optical signal with a second wavelength "λ2" is transmitted from a second main optical signal transmitter to a second wavelength-multiplexer 15b. A second optical identifier with a second wavelength "λsv" frequency-modulated at a second frequency "f2" is also transmitted from a second optical identifier transmitter 12b to the second wavelength-multiplexer 15b. The second main optical signal transmitter has the same configuration as the main optical signal transmitter 11 shown in FIG. 1, except that the second main optical signal transmitter transmits the second main optical signal with the second wavelength "λ2". The second optical identifier transmitter 12b also has the same configuration as the optical identifier transmitter 12 shown in FIG. 1, except that the second optical identifier transmitter 12b transmits the second optical identifier with the wavelength "λsv" which corresponds to the second wavelength "λ2" of the second main optical signal, wherein the second optical identifier is frequency-modulated at the second frequency "f2".

The second wavelength-multiplexer 15b performs wavelength-multiplexing of the second main optical signal and the second optical identifier to generate a second wavelength-multiplexed optical signal. The second wavelength-multiplexer 15b is optically connected through a second optical fiber 60b to the second input of the optical switch SW. The second wavelength-multiplexed optical signal is then transmitted through the second optical fiber 60b to the second input of the optical switch SW.

The second optical identifier transmitter 12b also supplies the memory 30 with second corresponding data which show a second relationship in correspondence between the second wavelength "λ2" of the second main optical signal outputted from the second main optical signal transmitter, and a second electric frequency component of the second frequency "f2" corresponding to the second main optical signal.

The optical switch SW allows transmissions of the first and second wavelength-multiplexed optical signals.

The memory 30 stores the above first and second corresponding data from the first and second optical identifier transmitter 12a and 12b. The memory 30 may be realized by any available devices, typical examples of which may include, but not limited to, various semiconductor memory devices, various magnetic recording devices such as hard-disk devices, various optical magnetic recording devices, and various recording mediums.

A first wavelength-demultiplexer 21a is connected through a third optical fiber 61a to the first output of the optical switch SW for receiving the first wavelength-demultiplexed optical signal. A second wavelength-demultiplexer 21b is connected through a fourth optical fiber 61b to the second output of the optical switch SW for receiving the second wavelength-demultiplexed optical signal.

The first wavelength-demultiplexer 21a performs a wavelength-demultiplexing of the first wavelength-multiplexed signal into the first main optical signal and the first optical identifier, so that the first wavelength-demultiplexer 21a transmits the first main optical signal to the first main optical signal receiver and also transmits the first optical identifier to the first optical identifier receiver 23a.

The second wavelength-demultiplexer 21b performs a wavelength-demultiplexing of the second wavelength-multiplexed signal into the second main optical signal and the second optical identifier, so that the second wavelength-demultiplexer 21b transmits the second main optical signal to the second main optical signal receiver and also transmits the second optical identifier to the second optical identifier receiver 23b.

The first optical identifier receiver 23a receives the first optical identifier from the first wavelength-demultiplexer 21a, so that the first optical identifier receiver 23a detects a first electric frequency component of the first frequency "f1" corresponding to the first main optical signal with the wavelength "λ1". The first optical identifier receiver 23a has the same configuration as the optical identifier receiver 23 shown in FIG. 1. Namely, the optical identifier receiver 23a may further include a first optical identifier detector 24a, a first frequency detector 25a and a first frequency comparator 26a. The first optical identifier detector 24a may be realized by a photo-detector PD which receives and detects the optical identifier.

The first optical identifier detector 24a receives the first optical identifier from the first wavelength-demultiplexer 21a, so that the first optical identifier detector 24a performs a photoelectric conversion of the first optical identifier into a detected electrical signal. The first frequency detector 25a receives the detected first electrical signal from the first optical identifier detector 24a and detects a first electric frequency component from the detected first electrical signal.

The first frequency comparator 26a receives the detected first electric frequency component from the first frequency detector 25a and also receives the first corresponding data from the memory 30, so that the first frequency comparator 26a performs a frequency-comparison of the detected first electric frequency component and the first reference electric frequency component included in the first corresponding data, wherein the first corresponding data show the first relationship in correspondence between the first wavelength "λ1" of the first main optical signal outputted from the first main optical signal transmitter, and the first reference electric frequency component of the first frequency "f1" corresponding to the first main optical signal. The first frequency comparator 26a generates a first frequency-comparison result which represents a desired or intended establishment of correct connection or route, or an undesired or unintended establishment of incorrect connection or route in the optical switch SW. The first frequency comparator 26a sends the first frequency-comparison result to the alarm generator 27.

The second optical identifier receiver 23b receives the second optical identifier from the second wavelength-demultiplexer 21b, so that the second optical identifier receiver 23b detects a second electric frequency component of the second frequency "f2" corresponding to the second main optical signal with the wavelength "λ2". The second optical identifier receiver 23b has the same configuration as the optical identifier receiver 23 shown in FIG. 1. Namely, the optical identifier receiver 23b may further include a second optical identifier detector 24b, a second frequency detector 25b and a second frequency comparator 26b. The second optical identifier detector 24b may be realized by a photo-detector PD which receives and detects the optical identifier.

The second optical identifier detector 24b receives the second optical identifier from the second wavelength-demultiplexer 21b, so that the second optical identifier detector 24b performs a photoelectric conversion of the second optical identifier into a detected electrical signal. The second frequency detector 25b receives the detected second electrical signal from the second optical identifier detector 24b and detects a second electric frequency component from the detected second electrical signal.

The second frequency comparator 26b receives the detected second electric frequency component from the second frequency detector 25b and also receives the second corresponding data from the memory 30, so that the second frequency comparator 26b performs a frequency-comparison of the detected second electric frequency component and the second reference electric frequency component included in the second corresponding data, wherein the second corresponding data show the second relationship in correspondence between the second wavelength "λ2" of the second main optical signal outputted from the second main optical signal transmitter, and the second reference electric frequency component of the second frequency "f2" corresponding to the second main optical signal. The second frequency comparator 26b generates a second frequency-comparison result which represents a desired or intended establishment of correct connection or route, or an undesired or unintended establishment of incorrect connection or route in the optical switch SW. The second frequency comparator 26b sends the second frequency-comparison result to the alarm generator 27.

The alarm generator 27 generates an alarm based on the first and second frequency-comparison results, if at least any one of the first and second frequency-comparison results is that the detected electric frequency component, which was included in the optical identifier, is different from the reference electric frequency component included in the corresponding data supplied from the memory 30. The difference between the detected electric frequency component and the reference electric frequency component represents that the undesired or unintended incorrect connection or route is established in the optical switch SW. Namely, the generated alarm alerts that the undesired or unintended incorrect connection or route is established in the optical switch SW.

The alarm generator 27 generates no alarm based on the first and second frequency-comparison results, if both the first and second frequency-comparison results are that the detected electric frequency component, which was included in the optical identifier, is identical with the reference electric frequency component included in the corresponding data supplied from the memory 30. The identity between the detected electric frequency component and the reference electric frequency component represents that the undesired or unintended incorrect connection or route is established in the optical switch SW. Namely, no generation of alarm notifies that the desired or intended correct connection or route is established in the optical switch SW.

If the correct connection or route is established in the optical switch SW, then the first optical identifier 23a detects only the electric frequency component at the first frequency "f1", while the second optical identifier 23b detects only the electric frequency component at the second frequency "f2".

If the incorrect connection or route is established in the optical switch SW, then the first optical identifier 23a detects only the electric frequency component at the second frequency "f2", while the second optical identifier 23b detects only the electric frequency component at the first frequency "f1".

If any undesired cross-talk appears in the optical switch SW, then each of the first and second optical identifiers 23a and 23b detects both the electric frequency components at the first and second frequencies "f1" and "f2".

The optical switch SW has a plurality of routes for transmissions of the wavelength-multiplexed optical signals including the main optical signal and the optical identifier.

This optical switch SW allows wavelength-multiplexing independently from the signal transmission rate and the transmission signal format, for which reason, the above-described conventional method of using the overhead applied to the synchronous digital hierarchy network is not applicable in order to monitor any undesired or unintended connection or route established in the optical switch SW.

In accordance with this embodiment, the transmitter performs the following operations. The first main optical signal is wavelength-multiplexed with the first optical identifier to generate the first wavelength-multiplexed optical signal which is then transited through the optical switch SW without any frequency modulation to the main optical signal. The second main optical signal is wavelength-multiplexed with the second optical identifier to generate the second wavelength-multiplexed optical signal which is then transited through the optical switch SW without any frequency modulation to the main optical signal. In parallel to this wavelength-multiplexed optical signal transmission without any frequency modulation to the main optical signal, the first corresponding data are generated, which show a first relationship in correspondence between the first wavelength "λ1" of the first main optical signal, and the first electric frequency component of the first frequency "f1" corresponding to the first main optical signal with the first wavelength "λ1". The second corresponding data are also generated, which show a second relationship in correspondence between the second wavelength "λ2" of the second main optical signal, and the second electric frequency component of the second frequency "f2" corresponding to the second main optical signal with the second wavelength "λ2".

The first and second wavelength-multiplexed optical signals are transmitted through the optical switch SW from the optical signal transmitter to the optical signal receiver.

The receiver performs the following operations. The first and second wavelength-multiplexed optical signals are wavelength-demultiplexed into the first and second main optical signals and the first and second optical identifiers. The first and second electric frequency components are detected from the first and second optical identifiers. In parallel, the first and second reference frequency informations including the first and second electric frequency components of the first and second main optical signals are received from the first and second transmitters, so that the first and second electric frequency components derived from the first and second optical identifiers are compared to the first and second electric frequency components derived from the first and second reference frequency informations. The identity between the electric frequency component derived from the optical identifier and the electric frequency component derived from the reference frequency information means that the intended or desired correct connection or route is established in the optical switch SW. The difference between the electric frequency component derived from the optical identifier and the electric frequency component derived from the reference frequency information means that the unintended or undesired incorrect connection or route is established in the optical switch SW. The monitoring to the correspondence between the optical signal transmitter and the optical signal receiver through the optical switch SW is accomplished with no frequency modulation to the main optical signal. No frequency modulation to the main optical signal causes no deterioration in quality of the main optical signal. Further, only the optical identifier wavelength-demultiplexed from the main optical signal is subjected to the photo-electric conversion to detect the electric frequency component from the optical identifier, while the wavelength-demultiplexed main optical signal is not subjected to any photo-electric conversion.

The first and second optical identifier transmitters 12a and 12b may be coupled to the memory 30 through any available connection interface. The first and second optical identifier receivers 23a and 23b may also be coupled to the memory 30 through any available connection interface. Typical examples of the available connection interface may include, but not limited to, any dedicated optical lines, and any dedicated electrical lines such as Ethernet (registered trademark).

As described above, the first and second optical identifier transmitters 12a and 12b generate the first and second corresponding data which show first and second relationships in correspondence between the first and second wavelength "λ1" and "λ2" of the first and second main optical signals outputted from the first and second main optical signal transmitters, and the first and second electric frequency components of the first and second frequencies "f1" and "f2" corresponding to the first and second main optical signals. The corresponding data are sent to the memory 30 and then stored in the memory 30, so that the first and second optical identifier receivers 23a and 23b read the corresponding data out of the memory 30.

As a modification to this embodiment, it is possible that the fixed corresponding data are previously stored in each of the first and second optical identifier transmitters 12a and 12b and the first and second optical identifier receivers 23a and 23b without using the memory 30.

As described above, the memory 30 may be realized by any available storing means, typical examples of which may include, but not limited to, various semiconductor memory devices, various magnetic recording devices such as hard-disk devices, various optical magnetic recording devices, various recording mediums, and any available data management stations or centers. The memory 30 may be placed at a single location or distributed.

Sixth Embodiment

Figure 6:
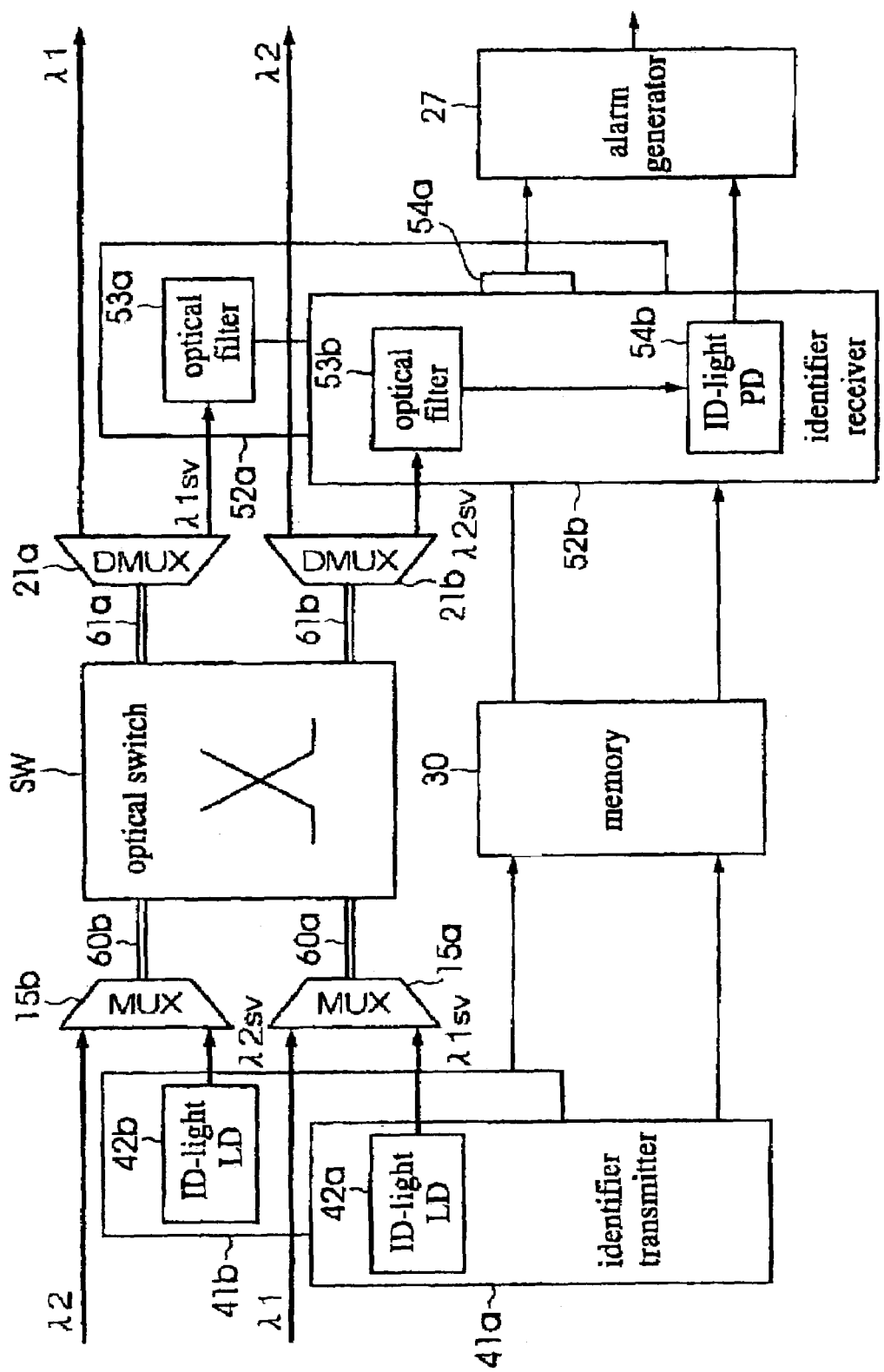
FIG. 6 is a block diagram illustrative of an optical signal transmission system including an optical signal transmitter and an optical signal receiver which are optically coupled to each other through an optical switch in a sixth embodiment in accordance with the present invention.

A sixth embodiment according to the present invention will be described in detail with reference to the drawings. FIG. 6 is a block diagram illustrative of an optical signal transmission system including an optical signal transmitter and an optical signal receiver which are optically coupled to each other through an optical switch.

An optical signal transmission system includes an optical signal transmitter and an optical signal receiver which are optically coupled to each other through an optical switch SW. The optical signal transmission system further includes a memory 30 which is coupled to both the optical signal transmitter and the optical signal receiver. This optical signal transmission system is configured to transmit first and second main optical signals with fixed first and second wavelengths from the optical signal transmitter-through the optical switch SW to the optical signal receiver.

The optical switch SW has first and second inputs and first and second outputs. The optical switch SW switches routes among the first and second inputs and the first and second outputs.

A first main optical signal with a first wavelength "λb 1" is transmitted from a first main optical signal transmitter to a first wavelength-multiplexer 15a. A first optical identifier with a first wavelength "λ1sv" uniquely corresponding to the first wavelength "λ1" of the first main optical signal is also transmitted from a first optical identifier transmitter 41a to the first wavelength-multiplexer 15a. The first main optical signal transmitter has the same configuration as the main optical signal transmitter 40 shown in FIG. 3, except that the first main optical signal transmitter transmits the first main optical signal with the first wavelength "λ1". The first optical identifier transmitter 41a also has the same configuration as the optical identifier transmitter 41 shown in FIG. 3, except that the first optical identifier transmitter 41a transmits the first optical identifier with the wavelength "λ1sv" which uniquely corresponds to the first wavelength "λ1" of the first main optical signal.

The first wavelength-multiplexer 15a performs wavelength-multiplexing of the first main optical signal and the first optical identifier to generate a first wavelength-multiplexed optical signal. The first wavelength-multiplexer 15a is optically connected through a first optical fiber 60a to the first input of the optical switch SW. The first wavelength-multiplexed optical signal is then transmitted through the first optical fiber 60a to the first input of the optical switch SW.

The first optical identifier transmitter 41a also supplies the memory 30 with first corresponding data which show a first relationship in correspondence between the first main optical signal with the first wavelength "λ1", and the first optical identifier with the wavelength "λ1sv" which uniquely corresponds to the first wavelength "λ1" of the first main optical signal.

A second main optical signal with a second wavelength "λ2" is transmitted from a second main optical signal transmitter to a second wavelength-multiplexer 15b. A second optical identifier with a second wavelength "λ2sv" which is uniquely corresponds to the second wavelength "λ2" of the second main optical signal is also transmitted from a second optical identifier transmitter 41b to the second wavelength-multiplexer 15b. The second main optical signal transmitter has the same configuration as the main optical signal transmitter 40 shown in FIG. 3, except that the second main optical signal transmitter transmits the second main optical signal with the second wavelength "λ2". The second optical identifier transmitter 41b also has the same configuration as the optical identifier transmitter 41 shown in FIG. 3, except that the second optical identifier transmitter 41b transmits the second optical identifier with the wavelength "λ2sv" which uniquely corresponds to the second wavelength "λ2" of the second main optical signal.

The second wavelength-multiplexer 15b performs wavelength-multiplexing of the second main optical signal and the second optical identifier to generate a second wavelength-multiplexed optical signal. The second wavelength-multiplexer 15b is optically connected through a second optical fiber 60b to the second input of the optical switch SW. The second wavelength-multiplexed optical signal is then transmitted through the second optical fiber 60b to the second input of the optical switch SW.

The second optical identifier transmitter 41b also supplies the memory 30 with second corresponding data which show a second relationship in correspondence between the second main optical signal with the second wavelength "λ2" and the second optical identifier with the with the wavelength "λ2sv" which uniquely corresponds to the second wavelength "λ2" of the second main optical signal.

The optical switch SW allows transmissions of the first and second wavelength-multiplexed optical signals.

The memory 30 stores the above first and second corresponding data from the first and second optical identifier transmitter 41a and 41b. The memory 30 may be realized by any available devices, typical examples of which may include, but not limited to, various semiconductor memory devices, various magnetic recording devices such as hard-disk devices, various optical magnetic recording devices, and various recording mediums.

A first wavelength-demultiplexer 21a is connected through a third optical fiber 61a to the first output of the optical switch SW for receiving the first wavelength-demultiplexed optical signal. A second wavelength-demultiplexer 21b is connected through a fourth optical fiber 61b to the second output of the optical switch SW for receiving the second wavelength-demultiplexed optical signal.

The first wavelength-demultiplexer 21a performs a wavelength-demultiplexing of the first wavelength-multiplexed signal into the first main optical signal and the first optical identifier, so that the first wavelength-demultiplexer 21a transmits the first main optical signal to the first main optical signal receiver and also transmits the first optical identifier to the first optical identifier receiver 52a.

The second wavelength-demultiplexer 21b performs a wavelength-demultiplexing of the second wavelength-multiplexed signal into the second main optical signal and the second optical identifier, so that the second wavelength-demultiplexer 21b transmits the second main optical signal to the second main optical signal receiver and also transmits the second optical identifier to the second optical identifier receiver 52b.

The first optical identifier receiver 52a receives the first optical identifier from the first wavelength-demultiplexer 21a, so that the first optical identifier receiver 52a performs a wavelength-filtering which allows a selective transmission of the first optical identifier with the wavelength "λ1sv" only but cuts off any other optical identifiers with the other wavelengths, and detects the first optical identifier with the wavelength "λ1sv" corresponding to the main optical signal with the wavelength "λ1" for comparing the detected first relationship between the wavelength "λ1sv" of the first optical identifier and the first wavelength "λ1" of the first main optical signal to the first relationship included in the first corresponding data. The first optical identifier receiver 52a may further include a first optical filter 53a and a first optical identifier detector 54a. The first optical filter 53a performs a wavelength-filtering which allows a selective transmission of the first optical identifier with the wavelength "λ1sv" only but cuts off any other optical identifiers with the other wavelengths. The first optical identifier detector 54a receives the first optical identifier with the wavelength "λ1sv" transmitted through the first optical filter 53a and detects the first optical identifier with the wavelength "λ1sv" corresponding to the first main optical signal with the first wavelength "λ1" for comparing the detected relationship between the wavelength "λ1sv" of the first optical identifier and the first wavelength "λ1" of the first main optical signal to the first relationship included in the first corresponding data. The first optical identifier detector 54a may be realized by a photo-detector PD which receives and detects the optical identifier. The first optical identifier detector 54a sends the first wavelength-comparison result to the alarm generator 27.

The second optical identifier receiver 52b receives the second optical identifier from the second wavelength-demultiplexer 21b, so that the second optical identifier receiver 52b performs a wavelength-filtering which allows a selective transmission of the second optical identifier with the wavelength "λ2sv" only but cuts off any other optical identifiers with the other wavelengths, and detects the second optical identifier with the wavelength "λ2sv" corresponding to the main optical signal with the wavelength "λ2" for comparing the detected second relationship between the wavelength "λ2sv" of the second optical identifier and the second wavelength "λ2" of the second main optical signal to the second relationship included in the second corresponding data. The second optical identifier receiver 52*b* may further include a second optical filter 53*b* and a second optical identifier detector 54*b*. The second optical filter 53*b* performs a wavelength-filtering which allows a selective transmission of the second optical identifier with the wavelength "λ2sv" only but cuts off any other optical identifiers with the other wavelengths. The second optical identifier detector 54*b* receives the second optical identifier with the wavelength "λ2sv" transmitted through the second optical filter 53*b* and detects the second optical identifier with the wavelength "λ2sv" corresponding to the second main optical signal with the second wavelength "λ2" for comparing the detected relationship between the wavelength "λ2sv" of the second optical identifier and the second wavelength "λ2" of the second main optical signal to the second relationship included in the second corresponding data. The second optical identifier detector 54*b* may be realized by a photo-detector PD which receives and detects the optical identifier. The second optical identifier detector 54*b* sends the second wavelength-comparison result to the alarm generator 27.

The alarm generator 27 generates an alarm based on the first and second wavelength-comparison results, if the first and second wavelength-comparison results are that the detected relationship between the wavelengths "λ1sv" and "λ2sv" of the first and second optical identifiers and the first and second wavelengths "λ1" and "λ2" of the first and second main optical signals are different from the stored first and second relationships included in the first and second corresponding data supplied from the memory 30. The difference of the relationships represents that the undesired or unintended incorrect connection or route is established in the optical switch SW. Namely, the generated alarm alerts that the undesired or unintended incorrect connection or route is established in the optical switch SW.

The alarm generator 27 generates no alarm based on the first and second wavelength-comparison results, if the first and second wavelength-comparison results are that the detected relationship between the wavelengths "λ1sv" and "λ2sv" of the first and second optical identifiers and the first and second wavelengths "λ1" and "λ2" of the first and second main optical signals are identical with the stored first and second relationships included in the first and second corresponding data supplied from the memory 30. The identity of the relationships represents that the undesired or unintended incorrect connection or route is established in the optical switch SW. Namely, no generation of alarm notifies that the desired or intended correct connection or route is established in the optical switch SW.

If the correct connection or route is established in the optical switch SW, then the first optical identifier 52*a* detects only the first wavelength component of "λ1sv", while the second optical identifier 52*b* detects only the second wavelength component of "λ2sv".

If the incorrect connection or route is established in the optical switch SW, then the first optical identifier 52*a* detects only the second wavelength component of "λ2sv", while the second optical identifier 52*b* detects only the first wavelength component of "λ1sv".

If any undesired cross-talk appears in the optical switch SW, then each of the first and second optical identifiers 52*a* and 52*b* detects both the first wavelength component of "λ1sv" and "λ2sv".

The optical switch SW has a plurality of routes for transmissions of the wavelength-multiplexed optical signals including the main optical signal and the optical identifier. This optical switch SW allows wavelength-multiplexing independently from the signal transmission rate and the transmission signal format, for which reason, the above-described conventional method of using the overhead applied to the synchronous digital hierarchy network is not applicable in order to monitor any undesired or unintended connection or route established in the optical switch SW.

In accordance with this embodiment, the transmitter performs the following operations. The first main optical signal is wavelength-multiplexed with the first optical identifier to generate the first wavelength-multiplexed optical signal which is then transited through the optical switch SW without any frequency modulation to the main optical signal. The second main optical signal is wavelength-multiplexed with the second optical identifier to generate the second wavelength-multiplexed optical signal which is then transited through the optical switch SW without any frequency modulation to the main optical signal. In parallel to this wavelength-multiplexed optical signal transmission without any frequency modulation to the main optical signal, the first corresponding data are generated, which show a first relationship in correspondence between the first main optical signal with the first wavelength "λ1", and the first optical identifier with the wavelength "λ1sv" which uniquely corresponds to the first wavelength "λ1" of the first main optical signal. The second corresponding data are also generated, which show a second relationship in correspondence between the second main optical signal with the second wavelength "λ2", and the second optical identifier with the wavelength "λ2sv" which uniquely corresponds to the second wavelength "λ2" of the second main optical signal.

The first and second wavelength-multiplexed optical signals are transmitted through the optical switch SW from the optical signal transmitter to the optical signal receiver.

The receiver performs the following operations. The wavelength-multiplexed optical signal is wavelength-demultiplexed into the main optical signal and the optical identifier. In parallel, the corresponding data are received from the transmitter, so that the detected relationships between the detected main optical signal and the detected optical identifier is compared to the reference relationship included in the corresponding data. The identity of the relationships means that the intended or desired correct connection or route is established in the optical switch SW. The difference of the relationships means that the unintended or undesired incorrect connection or route is established in the optical switch SW. The monitoring to the correspondence between the optical signal transmitter and the optical signal receiver through the optical switch SW is accomplished with no frequency modulation to the main optical signal. No frequency modulation to the main optical signal causes no deterioration in quality of the main optical signal. Further, the wavelength-demultiplexed main optical signal is not subjected to any photo-electric conversion.

The first and second optical identifier transmitters 41*a* and 41*b* may be coupled to the memory 30 through any available connection interface. The first and second optical identifier receivers 52*a* and 52*b* may also be coupled to the memory 30 through any available connection interface. Typical examples of the available connection interface may include, but not limited to, any dedicated optical lines, and any dedicated electrical lines such as Ethernet (registered trademark).

As described above, the first and second optical identifier transmitters 41a and 41b generate the corresponding data which show a relationship in correspondence between the first and second wavelengths "λ1" and "λ2" of the first and second main optical signals outputted from the first and second main optical signal transmitters, and the wavelengths "λ1sv" and "λ2sv" of the first and second optical identifiers outputted from the first and second optical identifier transmitters 41a and 41b. The first and second corresponding data are sent to the memory 30 and then stored in the memory 30, so that the first and second optical identifier receivers 52a and 52b read the first and second corresponding data out of the memory 30.

As a modification to this embodiment, it is possible that the fixed corresponding data are previously stored in each of the first and second optical identifier transmitters 41a and 41b and the first and second optical identifier receivers 52a and 52b without using the memory 30.

As described above, the memory 30 may be realized by any available storing means, typical examples of which may include, but not limited to, various semiconductor memory devices, various magnetic recording devices such as hard-disk devices, various optical magnetic recording devices, various recording mediums, and any available data management stations or centers. The memory 30 may be placed at a single location or distributed.

As a modification to this embodiment, it is possible to use an arrayed waveguide grating instead of a set of the wavelength-demultiplexer 21, and the optical filters 51a, 51b, 53a and 53b because the arrayed waveguide grating performs substantially the same function as the function of the set of the wavelength-demultiplexer 21, and the optical filters 51a, 51b, 53a and 53b.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. An optical signal transmission system including at least one optical signal transmitter and at least one optical signal receiver,
    wherein said at least one optical signal transmitter generates at least one optical identifier belonging to and being different in wavelength from at least one main optical signal;
    wherein said at least one optical signal transmitter performs a wavelength-multiplexing of said at least one main optical signal and said at least one optical identifier to transmit at least one wavelength-multiplexed optical signal to said at least one optical signal receiver;
    wherein said at least one optical signal receiver performs a wavelength-demultiplexing of said at least one wavelength-multiplexed optical signal to generate said at least one main optical signal and said at least one optical identifier; and
    wherein said at least one optical signal receiver further verifies whether a correct transmission route is established, based on said at least one optical identifier with reference to at least one set of corresponding data, which include a first relationship in correspondence between said at least one main optical signal and said at least one optical identifier.

2. The optical signal transmission system as claimed in claim 1, wherein said at least one optical signal receiver performs said verification by comparing said first relationship included in said at least one set of corresponding data to a second relationship between said at least one main optical signal received by said at least one optical signal receiver and said at least one optical identifier detected by said at least one optical signal receiver.

3. The optical signal transmission system as claimed in claim 1, wherein said at least one optical signal receiver performs said verification without subjecting said at least one main optical signal to any photoelectric conversion, and independently from any transmission rate and any format of said at least one main optical signal.

4. The optical signal transmission system as claimed in claim 1, wherein said at least one optical signal transmitter further generates said at least one set of corresponding data, and supplies said at least one optical signal receiver with said at least one set of corresponding data.

5. The optical signal transmission system as claimed in claim 4, further including a memory being coupled to said optical signal transmitter and said optical signal receiver, and said memory storing said at least one set of corresponding data.

6. The optical signal transmission system as claimed in claim 4, further including a data storing station being coupled to said optical signal transmitter and said optical signal receiver, and said data storing station storing said at least one set of corresponding data.

7. The optical signal transmission system as claimed in claim 1, wherein each of said at least one optical signal transmitter and said at least one optical signal receiver previously stores said at least one set of corresponding data.

8. The optical signal transmission system as claimed in claim 1, wherein said at least one optical signal receiver further includes:
    a notifying unit that receives a result of said verification from said at least one optical signal receiver, and whether said correct transmission route is verified between said main optical signal transmitted by said at least one optical signal transmitter and said main optical signal received by said at least one optical signal receiver.

9. The optical signal transmission system as claimed in claim 1, further including a wavelength-multiplexed optical network including a plurality of wavelength-multiplexed optical signal transmission routes, through which said at least one wavelength-multiplexed optical signal is transmitted from said at least one optical signal transmitter to said at least one optical signal receiver.

10. The optical signal transmission system as claimed in claim 1, further including an optical switch including a plurality of selectable wavelength-multiplexed optical signal transmission routes, through which said at least one wavelength-multiplexed optical signal is transmitted from said at least one optical signal transmitter to said at least one optical signal receiver.

11. The optical signal transmission system as claimed in claim 1, wherein said at least one set of corresponding data includes a relationship in correspondence between at least one wavelength of said at least one main optical signal and at least one reference electric frequency component of at least one frequency corresponding to said at least one main optical signal;

wherein said at least one optical signal receiver detects at least one electric frequency component from said at least one optical identifier wavelength-demultiplexed; and wherein said at least one optical signal receiver verifies whether said correct transmission route is established based on said at least one electric frequency component with reference to said at least one reference electric frequency component included in said at least one set of corresponding data.

12. The optical signal transmission system as claimed in claim 11, wherein each of said at least one optical signal transmitter further includes:

at least one set of a main optical signal generator that generates said at least one main optical signal, and an optical identifier generator that generates said at least one optical identifier and said at least one set of corresponding data; and a multiplexer that wavelength-multiplexes said at least one main optical signal and said at least one optical identifier to generate said wavelength-multiplexed optical signal, and wherein each of said at least one optical signal receiver further includes:

a demultiplexer that wavelength-multiplexes said wavelength-multiplexed optical signal to generate said at least one main optical signal and said at least one optical identifier;

at least one set of a main optical signal receiver that receives said at least one main optical signal wavelength-demultiplexed; and an optical identifier receiver that receives said at least one optical identifier and said at least one set of corresponding data, and said optical identifier receiver further verifies whether said correct transmission route is established based on said at least optical identifier with reference to said at least one set of corresponding data.

13. The optical signal transmission system as claimed in claim 12, wherein each of said at least one optical identifier generator further includes:

a frequency modulator that generates a frequency-modulated signal at a frequency corresponding to each of said at least one main optical signal; and an optical identifier generator that generates said at least one optical identifier frequency-modulated by said frequency-modulated signal, and wherein each of said at least one optical identifier receiver further includes:

a photoelectric converter that performs a photoelectric conversion of each of said at least one optical identifier into an detected electrical signal;

a frequency detector that detects an electric frequency component from said detected electrical signal; and a frequency comparator that compares said electric frequency component detected to said at least one reference electric frequency component included in said at least one set of corresponding data.

14. The optical signal transmission system as claimed in claim 12, wherein each of said at least one optical signal transmitter further includes:

plural sets of said main optical signal generators and said optical identifier generators, and wherein each of said at least one optical signal receiver further includes:

plural sets of said main optical signal receivers and said optical identifier receivers, wherein said main optical signal generators respectively generate said main optical signals with wavelengths different from each other;

wherein said optical identifier generators respectively generate said optical identifiers which belong to said main optical signals generated from said main optical signal generators, respectively, and said optical identifier generators further respectively generate plural sets of said corresponding data which respectively belong to said main optical signals generated from said main optical signal generators and said optical identifiers generated from said optical identifier generators;

wherein said main optical signal receivers receive said main optical signals from respectively corresponding ones of said main optical signal generators;

wherein said optical identifier receivers respectively receive said optical identifiers from respectively corresponding ones of said optical identifier generators, and said optical identifier receivers respectively receive said plural sets of said corresponding data from respectively corresponding ones of said optical identifier generators; and wherein each of said optical identifier receivers verifies whether said correct transmission route is established based on each corresponding one of said optical identifiers with reference to each corresponding set of said corresponding data.

15. The optical signal transmission system as claimed in claim 1, wherein each of said at least one set of corresponding data includes a relationship in correspondence between a first wavelength of said main optical signal and a second wavelength of said optical identifier uniquely belonging to said main optical signal, so that said second wavelength uniquely corresponds to said first wavelength;

wherein said at least one optical signal receiver selectively detects said at least one optical identifier with said second wavelength; and wherein said at least one optical signal receiver verifies whether said correct transmission route is established based on said detected at least one optical identifier with reference to said at least one set of corresponding data.

16. The optical signal transmission system as claimed in claim 15, wherein each of said at least one optical signal transmitter further includes:

at least one set of a main optical signal generator that generates said main optical signal with said first wavelength, and an optical identifier generator that generates said optical identifier with said second wavelength and that generates said at least one set of corresponding data; and a multiplexer that wavelength-multiplexes said at least one main optical signal and said at least one optical identifier to generate said wavelength-multiplexed optical signal, and wherein each of said at least one optical signal receiver further includes:

a demultiplexer that wavelength-multiplexes said wavelength-multiplexed optical signal to generate said at least one main optical signal and said at least one optical identifier;

at least one set of a main optical signal receiver that selectively receives said at least one main optical signal with said first wavelength, and an optical identifier receiver that selectively receives said at least one optical identifier with said second wavelength, and wherein said optical identifier receiver further verifies whether said correct transmission route is established based on said at least optical identifier with reference to said at least one set of corresponding data.

17. The optical signal transmission system as claimed in claim 16, wherein each of said at least one optical identifier generator further includes:
an optical identifier generator that generates said optical identifier including said second wavelength, and
wherein each of said at least one main optical signal receiver further includes:
a first optical filter that selectively transmits said main optical signal with said first wavelength; and
a main optical signal receiver that receives said main optical signal with said first wavelength transmitted through said first optical filter;
wherein each of said at least one optical identifier receiver further includes:
a second optical filter that selectively transmits said optical identifier with said second wavelength; and
an optical identifier detector that detects said optical identifier with said second wavelength transmitted through said second optical filter; and that compares said optical identifier including said second wavelength to said at least one set of corresponding data.

18. The optical signal transmission system as claimed in claim 16, wherein each of said at least one optical signal transmitter further includes:
plural sets of said main optical signal generators and said optical identifier generators,
wherein each of said at least one optical signal receiver further includes:
said main optical signal receivers and said optical identifier receivers,
wherein said main optical signal generators respectively generate said main optical signals with wavelengths different from each other;
wherein said optical identifier generators respectively generate said optical identifiers including wavelengths respectively correspond to said wavelengths of said main optical signals generated from said main optical signal generators, and said optical identifier generators further respectively generate plural sets of said corresponding data which respectively belong to said main optical signals generated from said main optical signal generators and said optical identifiers generated from said optical identifier generators;
wherein said main optical signal receivers receive said main optical signals from respectively corresponding ones of said main optical signal generators;
wherein said optical identifier receivers respectively receive said optical identifiers from respectively corresponding ones of said optical identifier generators, and said optical identifier receivers respectively receive said plural sets of said corresponding data from respectively corresponding ones of said optical identifier generators; and
wherein each of said optical identifier receivers verifies whether said correct transmission route is established based on each corresponding one of said optical identifiers with reference to each corresponding set of said corresponding data.

19. The optical signal transmission system as claimed in claim 15, wherein each of said at least one optical signal transmitter further includes:
at least one set of a main optical signal generator that generates said main optical signal with said first wavelength, and an optical identifier generator that generates said optical identifier with said second wavelength and that generates said at least one set of corresponding data; and
a multiplexer that wavelength-multiplexes said at least one main optical signal and said at least one optical identifier to generate said wavelength-multiplexed optical signal, and
wherein each of said at least one optical signal receiver further includes:
an arrayed waveguide grating that wavelength-demultiplexes said wavelength-multiplexed optical signal to generate said at least one main optical signal with said first wavelength and said at least one optical identifier with said second wavelength;
at least one set of a main optical signal receiver that selectively receives said at least one main optical signal with said first wavelength, and an optical identifier receiver that selectively receives said at least one optical identifier with said second wavelength, and wherein said optical identifier receiver further verifies whether said correct transmission route is established based on said at least optical identifier with reference to said at least one set of corresponding data.

20. The optical signal transmission system as claimed in claim 19, wherein each of said at least one optical identifier generator further includes:
an optical identifier generator that generates said optical identifier including said second wavelength, and
wherein each of said at least one main optical signal receiver further includes:
a main optical signal receiver that receives said main optical signal with said first wavelength transmitted through said arrayed waveguide grating;
wherein each of said at least one optical identifier receiver further includes:
an optical identifier detector that detects said optical identifier with said second wavelength transmitted through said arrayed waveguide grating; and that compares said optical identifier including said second wavelength to said at least one set of corresponding data.

21. An optical signal transmitter including:
a first transmitter function block that generates at least one optical identifier belonging to and being different in wavelength from at least one main optical signal; and
a second transmitter function block that performs a wavelength-multiplexing of said at least one main optical signal and said at least one optical identifier to transmit at least one wavelength-multiplexed optical signal,
wherein said at least optical identifier references at least one set of corresponding data, which include a first relationship in correspondence between said at least one main optical signal and said at least one optical identifier.

22. The optical signal transmitter as claimed in claim 21, wherein said first transmitter function block further generates at least one set of corresponding data, which include a first relationship in correspondence between said at least one main optical signal and said at least one optical identifier.

23. The optical signal transmitter as claimed in claim 22, wherein said second transmitter function block sends said at least one set of corresponding data to a memory, so that said memory stores said at least one set of corresponding data.

24. The optical signal transmitter as claimed in claim 22, wherein said second transmitter function block sends said at least one set of corresponding data to a data storing station, so that said data storing station stores said at least one set of corresponding data.

25. The optical signal transmitter as claimed in claim 21, wherein said first transmitter function block previously stores said at least one set of corresponding data.

26. The optical signal transmitter as claimed in claim 21, wherein said second transmitter function block transmits said at least one wavelength-multiplexed optical signal through a wavelength-multiplexed optical network including a plurality of wavelength-multiplexed optical signal transmission routes.

27. The optical signal transmitter as claimed in claim 21, wherein said second transmitter function block transmits said at least one wavelength-multiplexed optical signal through an optical switch including a plurality of selectable wavelength-multiplexed optical signal transmission routes.

28. The optical signal transmitter as claimed in claim 21, wherein said at least one set of corresponding data includes a relationship in correspondence between at least one wavelength of said at least one main optical signal and at least one reference electric frequency component of at least one frequency corresponding to said at least one main optical signal.

29. The optical signal transmitter as claimed in claim 28, wherein said first transmitter function block further includes:
at least one set of a main optical signal generator that generates said at least one main optical signal, and an optical identifier generator that generates said at least one optical identifier and said at least one set of corresponding data; and
wherein said second transmitter function block further includes:
a multiplexer that wavelength-multiplexes said at least one main optical signal and said at least one optical identifier to generate said wavelength-multiplexed optical signal.

30. The optical signal transmitter as claimed in claim 29, wherein said at least one optical identifier generator further includes:
a frequency modulator that generates a frequency-modulated signal at a frequency corresponding to each of said at least one main optical signal; and
an optical identifier generator that generates said at least one optical identifier frequency-modulated by said frequency-modulated signal.

31. The optical signal transmitter as claimed in claim 29, wherein said first transmitter function block further includes:
plural sets of said main optical signal generators and said optical identifier generators,
wherein said main optical signal generators respectively generate said main optical signals with wavelengths different from each other; and
wherein said optical identifier generators respectively generate said optical identifiers which belong to said main optical signals generated from said main optical signal generators, respectively, and said optical identifier generators further respectively generate plural sets of said corresponding data which respectively belong to said main optical signals generated from said main optical signal generators and said optical identifiers generated from said optical identifier generators.

32. The optical signal transmitter as claimed in claim 21, wherein each of said at least one set of corresponding data includes a relationship in correspondence between a first wavelength of said main optical signal and a second wavelength of said optical identifier uniquely belonging to said main optical signal, so that said second wavelength uniquely corresponds to said first wavelength.

33. The optical signal transmitter as claimed in claim 32, wherein said first transmitter function block further includes:
at least one set of a main optical signal generator that generates said main optical signal with said first wavelength, and an optical identifier generator that generates said optical identifier with said second wavelength and that generates said at least one set of corresponding data; and
wherein said second transmitter function block further includes:
a multiplexer that wavelength-multiplexes said at least one main optical signal and said at least one optical identifier to generate said wavelength-multiplexed optical signal.

34. The optical signal transmitter as claimed in claim 33, wherein each of said at least one optical identifier generator further includes:
an optical identifier generator that generates said optical identifier including said second wavelength.

35. The optical signal transmitter as claimed in claim 33, wherein said first transmitter function block further includes:
plural sets of said main optical signal generators and said optical identifier generators,
wherein said main optical signal generators respectively generate said main optical signals with wavelengths different from each other; and
wherein said optical identifier generators respectively generate said optical identifiers including wavelengths respectively correspond to said wavelengths of said main optical signals generated from said main optical signal generators, and said optical identifier generators further respectively generate plural sets of said corresponding data which respectively belong to said main optical signals generated from said main optical signal generators and said optical identifiers generated from said optical identifier generators.

36. The optical signal transmitter as claimed in claim 32, wherein said first transmitter function block further includes:
at least one set of a main optical signal generator that generates said main optical signal with said first wavelength, and an optical identifier generator that generates said optical identifier with said second wavelength and that generates said at least one set of corresponding data; and
wherein said second transmitter function block further includes:
a multiplexer that wavelength-multiplexes said at least one main optical signal and said at least one optical identifier to generate said wavelength-multiplexed optical signal.

37. The optical signal transmitter as claimed in claim 36, wherein each of said at least one optical identifier generator further includes:
an optical identifier generator that generates said optical identifier including said second wavelength.

38. An optical signal receiver including:
a first receiver function block that performs a wavelength-demultiplexing of at least one wavelength-multiplexed optical signal to generate at least one main optical signal and at least one optical identifier; and
a second receiver function block that verifies whether a correct transmission route is established, based on said at least optical identifier with reference to at least one set of corresponding data, which include a first relationship in correspondence between said at least one main optical signal and said at least one optical identifier.

39. The optical signal receiver as claimed in claim 38, wherein said second receiver function performs said verification by comparing said first relationship included in said at least one set of corresponding data to a second relationship between said at least one main optical signal received by said at least one optical signal receiver and said at least one optical identifier detected by said at least one optical signal receiver.

40. The optical signal receiver as claimed in claim 38, wherein said second receiver function block performs said verification without subjecting said at least one main optical signal to any photoelectric conversion, and independently from any transmission rate and any format of said at least one main optical signal.

41. The optical signal receiver as claimed in claim 38, wherein said second receiver function block receives said at least one set of corresponding data stored in a memory.

42. The optical signal receiver as claimed in claim 38, wherein said second receiver function block receives said at least one set of corresponding data stored in a data storing station.

43. The optical signal receiver as claimed in claim 38, wherein said second receiver function block previously stores said at least one set of corresponding data.

44. The optical signal receiver as claimed in claim 38, further including:
a notifying unit that receives a result of said verification from said at least one optical signal receiver, and that notifies whether said correct transmission route is verified between said main optical signal transmitted and said main optical signal received by said at least one optical signal receiver.

45. The optical signal receiver as claimed in claim 38, wherein said first receiver function block receives said at least one wavelength-multiplexed optical signal transmitted from a wavelength-multiplexed optical network including a plurality of wavelength-multiplexed optical signal transmission routes.

46. The optical signal receiver as claimed in claim 38, wherein said first receiver function block receives said at least one wavelength-multiplexed optical signal transmitted from an optical switch including a plurality of selectable wavelength-multiplexed optical signal transmission routes.

47. The optical signal receiver as claimed in claim 38, wherein said at least one set of corresponding data includes a relationship in correspondence between at least one wavelength of said at least one main optical signal and at least one reference electric frequency component of at least one frequency corresponding to said at least one main optical signal;
wherein said second receiver function block detects at least one electric frequency component from said at least one optical identifier wavelength-demultiplexed; and
wherein said second receiver function block verifies whether said correct transmission route is established based on said at least one electric frequency component with reference to said at least one reference electric frequency component included in said at least one set of corresponding data.

48. The optical signal receiver as claimed in claim 47, wherein said first receiver function block further includes:

a demultiplexer that wavelength-multiplexes said wavelength-multiplexed optical signal to generate said at least one main optical signal and said at least one optical identifier; and
at least one set of a main optical signal receiver that receives said at least one main optical signal wavelength-demultiplexed; and
wherein said second receiver function block further includes:
an optical identifier receiver that receives said at least one optical identifier and said at least one set of corresponding data, and said optical identifier receiver further verifies whether said correct transmission route is established based on said at least optical identifier with reference to said at least one set of corresponding data.

49. The optical signal receiver as claimed in claim 48, wherein each of said at least one optical identifier receiver further includes:
a photoelectric converter that performs a photoelectric conversion of each of said at least one optical identifier into an detected electrical signal;
a frequency detector that detects an electric frequency component from said detected electrical signal; and
a frequency comparator that compares said electric frequency component detected to said at least one reference electric frequency component included in said at least one set of corresponding data.

50. The optical signal receiver as claimed in claim 48, wherein said optical signal receiver further includes:
plural sets of said main optical signal receivers and said optical identifier receivers,
wherein said main optical signal receivers receive said main optical signals from respectively corresponding ones of said main optical signal generators;
wherein said optical identifier receivers respectively receive said optical identifiers from respectively corresponding ones of said optical identifier generators, and said optical identifier receivers respectively receive said plural sets of said corresponding data from respectively corresponding ones of said optical identifier generators; and
wherein each of said optical identifier receivers verifies whether said correct transmission route is established based on each corresponding one of said optical identifiers with reference to each corresponding set of said corresponding data.

51. The optical signal receiver as claimed in claim 38, wherein each of said at least one set of corresponding data includes a relationship in correspondence between a first wavelength of said main optical signal and a second wavelength of said optical identifier uniquely belonging to said main optical signal, so that said second wavelength uniquely corresponds to said first wavelength;
wherein said second receiver function block selectively detects said at least one optical identifier with said second wavelength; and
wherein said second receiver function block verifies whether said correct transmission route is established based on said detected at least one optical identifier with reference to said at least one set of corresponding data.

52. The optical signal receiver as claimed in claim 51, wherein said first receiver function block further includes:
a demultiplexer that wavelength-demultiplexes said wavelength-multiplexed optical signal to generate said at least one main optical signal and said at least one optical identifier; and wherein said second receiver function block further includes:
at least one set of a main optical signal receiver that selectively receives said at least one main optical signal with said first wavelength, and an optical identifier receiver that selectively receives said at least one optical identifier with said second wavelength, and wherein said optical identifier receiver further verifies whether said correct transmission route is established based on said at least optical identifier with reference to said at least one set of corresponding data.

53. The optical signal receiver as claimed in claim 52, wherein each of said at least one main optical signal receiver further includes:
a first optical filter that selectively transmits said main optical signal with said first wavelength; and
a main optical signal receiver that receives said main optical signal with said first wavelength transmitted through said first optical filter;
wherein each of said at least one optical identifier receiver further includes:
a second optical filter that selectively transmits said optical identifier with said second wavelength; and
an optical identifier detector that detects said optical identifier with said second wavelength transmitted through said second optical filter; and that compares said optical identifier including said second wavelength to said at least one set of corresponding data.

54. The optical signal receiver as claimed in claim 51, wherein said first receiver function block further includes:
an arrayed waveguide grating that wavelength-demultiplexes said wavelength-multiplexed optical signal to generate said at least one main optical signal with said first wavelength and said at least one optical identifier with said second wavelength; and
at least one main optical signal receiver that selectively receives said at least one main optical signal with said first wavelength; and
wherein said second receiver function block further includes:
an optical identifier receiver that selectively receives said at least one optical identifier with said second wavelength, and wherein said optical identifier receiver further verifies whether said correct transmission route is established based on said at least optical identifier with reference to said at least one set of corresponding data.

55. The optical signal receiver as claimed in claim 54, wherein each of said at least one main optical signal receiver further includes:
a main optical signal receiver that receives said main optical signal with said first wavelength transmitted through said arrayed waveguide grating; and
wherein each of said at least one optical identifier receiver further includes:
an optical identifier detector that detects said optical identifier with said second wavelength transmitted through said arrayed waveguide grating; and that compares said optical identifier including said second wavelength to said at least one set of corresponding data.

56. The optical signal receiver as claimed in claim 52, wherein said first receiver function block further includes said main optical signal receivers and said second receiver function block further includes said optical identifier receivers, wherein said main optical signal receivers receive said main optical signals from respectively corresponding ones of said main optical signal generators;
wherein said optical identifier receivers respectively receive said optical identifiers from respectively corresponding ones of said optical identifier generators, and said optical identifier receivers respectively receive said plural sets of said corresponding data from respectively corresponding ones of said optical identifier generators; and
wherein each of said optical identifier receivers verifies whether said correct transmission route is established based on each corresponding one of said optical identifiers with reference to each corresponding set of said corresponding data.

57. A method of monitoring establishment of a correct transmission route between at least one optical signal transmitter and at least one optical signal receiver, said method including:
generating at least one optical identifier belonging to and being different in wavelength from at least one main optical signal;
performing a wavelength-multiplexing of said at least one main optical signal and said at least one optical identifier to transmit at least one wavelength-multiplexed optical signal to said at least one optical signal receiver;
performing a wavelength-demultiplexing of said at least one wavelength-multiplexed optical signal to generate said at least one main optical signal and said at least one optical identifier; and
verifying whether a correct transmission route is established, based on said at least optical identifier with reference to at least one set of corresponding data, which include a first relationship in correspondence between said at least one main optical signal and said at least one optical identifier.

58. The method as claimed in claim 57, wherein said verification is made by comparing said first relationship included in said at least one set of corresponding data to a second relationship between said at least one main optical signal received by said at least one optical signal receiver and said at least one optical identifier detected by said at least one optical signal receiver.

59. The method as claimed in claim 57, wherein said verification is made without subjecting said at least one main optical signal to any photoelectric conversion, and independently from any transmission rate and any format of said at least one main optical signal.

60. The method as claimed in claim 57, further including:
sending said at least one set of corresponding data from said at least one optical signal transmitter to said at least one optical signal receiver.

61. The method as claimed in claim 60, further including:
storing said at least one set of corresponding data in a memory being coupled to said optical signal transmitter and said optical signal receiver.

62. The method as claimed in claim 60, further including:
storing said at least one set of corresponding data in a data storing station being coupled to said optical signal transmitter and said optical signal receiver.

63. The method as claimed in claim 57, further including:
previously storing said at least one set of corresponding data in each of said at least one optical signal transmitter and said at least one optical signal receiver.

64. The method as claimed in claim 57, further including:
notifying whether said correct transmission route is verified between said main optical signal transmitted by said at least one optical signal transmitter and said main optical signal received by said at least one optical signal receiver.

65. The method as claimed in claim 57, further including:
transmitting said at least one wavelength-multiplexed optical signal from said at least one optical signal transmitter to said at least one optical signal receiver through a wavelength-multiplexed optical network including a plurality of wavelength-multiplexed optical signal transmission routes.

66. The method as claimed in claim 57, further including:
transmitting said at least one wavelength-multiplexed optical signal from said at least one optical signal transmitter to said at least one optical signal receiver through an optical switch including a plurality of selectable wavelength-multiplexed optical signal transmission routes.

67. The method as claimed in claim 57, wherein said at least one set of corresponding data includes a relationship in correspondence between at least one wavelength of said at least one main optical signal and at least one reference electric frequency component of at least one frequency corresponding to said at least one main optical signal; and wherein said method further includes:
detecting at least one electric frequency component from said at least one optical identifier wavelength-demultiplexed; and
verifying whether said correct transmission route is established based on said at least one electric frequency component with reference to said at least one reference electric frequency component included in said at least one set of corresponding data.

68. The method as claimed in claim 67, further including:
generating a frequency-modulated signal at a frequency corresponding to each of said at least one main optical signal; and
generating said at least one optical identifier frequency-modulated by said frequency-modulated signal;
performing a photoelectric conversion of each of said at least one optical identifier into an detected electrical signal;
detecting an electric frequency component from said detected electrical signal; and
comparing said electric frequency component detected to said at least one reference electric frequency component included in said at least one set of corresponding data.

69. The method as claimed in claim 57, wherein each of said at least one set of corresponding data includes a relationship in correspondence between a first wavelength of said main optical signal and a second wavelength of said optical identifier uniquely belonging to said main optical signal, so that said second wavelength uniquely corresponds to said first wavelength; and
wherein said method further includes:
selectively detecting said at least one optical identifier with said second wavelength; and
verifies whether said correct transmission route is established based on said detected at least one optical identifier with reference to said at least one set of corresponding data.

70. The method as claimed in claim 69, further including:
generating said optical identifier including said second wavelength;
selectively transmitting said main optical signal with said first wavelength;
selectively transmitting said optical identifier with said second wavelength;
detecting said optical identifier with said second wavelength transmitted through said second optical filter; and
comparing said optical identifier including said second wavelength to said at least one set of corresponding data.

71. A method of transmitting an optical signal, including:
generating at least one optical identifier belonging to and being different in wavelength from at least one main optical signal;
performing a wavelength-multiplexing of said at least one main optical signal and said at least one optical identifier to transmit at least one wavelength-multiplexed optical signal to said at least one optical signal receiver, and
referencing at least one set of corresponding data by said at least one optical identifier, said at least one set of corresponding data include a first relationship in correspondence between said at least one main optical signal and said at least one optical identifier.

72. A method of receiving an optical signal transmitted, including:
performing a wavelength-demultiplexing of said at least one wavelength-multiplexed optical signal to generate said at least one main optical signal and said at least one optical identifier; and
verifying whether a correct transmission route is established, based on said at least optical identifier with reference to at least one set of corresponding data, which include a first relationship in correspondence between said at least one main optical signal and said at least one optical identifier.

73. The method as claimed in claim 72, wherein said verification is made by comparing said first relationship included in said at least one set of corresponding data to a second relationship between said at least one main optical signal received by said at least one optical signal receiver and said at least one optical identifier detected by said at least one optical signal receiver.

74. The method as claimed in claim 72, wherein said verification is made without subjecting said at least one main optical signal to any photoelectric conversion, and independently from any transmission rate and any format of said at least one main optical signal.

75. An optical signal transmission system including at least one optical signal transmitter and at least one optical signal receiver,
wherein said at least one optical signal transmitter generates at least one optical identifier belonging to and being different in wavelength from at least one main optical signal;
wherein said at least one optical signal transmitter performs a wavelength-multiplexing of said at least one main optical signal and said at least one optical identifier to transmit at least one wavelength-multiplexed optical signal to said at least one optical signal receiver;
wherein said at least one optical signal receiver performs a wavelength-demultiplexing of said at least one wavelength-multiplexed optical signal to generate said at least one main optical signal and said at least one optical identifier; and
wherein said at least one optical signal receiver further verifies whether a correct transmission route is established, based on said at least one optical identifier with reference to at least one set of corresponding data, which include a first relationship in correspondence between said at least one main optical signal and said at least one optical identifier, wherein said at least one optical signal receiver performs said verification by comparing said first relationship included in said at least one set of corresponding data to a second relationship between said at least one main optical signal received by said at least one optical signal receiver and said at least one optical identifier detected by said at least one optical signal receiver.

76. An optical signal transmitter including:

a first transmitter function block that generates at least one optical identifier belonging to and being different in wavelength from at least one main optical signal; and a second transmitter function block that performs a wavelength-multiplexing of said at least one main optical signal and said at least one optical identifier to transmit at least one wavelength-multiplexed optical signal, wherein said at least one set of corresponding data includes a relationship in correspondence between at least one wavelength of said at least one main optical signal and at least one reference electric frequency component of at least one frequency corresponding to said at least one main optical signal.

77. An optical signal receiver including:

a first receiver function block that performs a wavelength-demultiplexing of at least one wavelength-multiplexed optical signal to generate at least one main optical signal and at least one optical identifier; and a second receiver function block that verifies whether a correct transmission route is established, based on said at least optical identifier with reference to at least one set of corresponding data, which include a first relationship in correspondence between said at least one main optical signal and said at least one optical identifier, wherein said second receiver function block performs said verification without subjecting said at least one main optical signal to any photoelectric conversion, and independently from any transmission rate and any format of said at least one main optical signal.

78. A method of monitoring establishment of a correct transmission route between at least one optical signal transmitter and at least one optical signal receiver, said method including:

generating at least one optical identifier belonging to and being different in wavelength from at least one main optical signal;

performing a wavelength-multiplexing of said at least one main optical signal and said at least one optical identifier to transmit at least one wavelength-multiplexed optical signal to said at least one optical signal receiver;

performing a wavelength-demultiplexing of said at least one wavelength-multiplexed optical signal to generate said at least one main optical signal and said at least one optical identifier; and verifying whether a correct transmission route is established, based on said at least optical identifier with reference to at least one set of corresponding data, which include a first relationship in correspondence between said at least one main optical signal and said at least one optical identifier, wherein said verification is made by comparing said first relationship included in said at least one set of corresponding data to a second relationship between said at least one main optical signal received by said at least one optical signal receiver and said at least one optical identifier detected by said at least one optical signal receiver.

79. A method of receiving an optical signal transmitted, including:

performing a wavelength-demultiplexing of said at least one wavelength-multiplexed optical signal to generate said at least one main optical signal and said at least one optical identifier; and verifying whether a correct transmission route is established, based on said at least optical identifier with reference to at least one set of corresponding data, which include a first relationship in correspondence between said at least one main optical signal and said at least one optical identifier, wherein said verification is made by comparing said first relationship included in said at least one set of corresponding data to a second relationship between said at least one main optical signal received by said at least one optical signal receiver and said at least one optical identifier detected by said at least one optical signal receiver.

* * * * *